US012001520B2

(12) United States Patent
Sinha et al.

(10) Patent No.: US 12,001,520 B2
(45) Date of Patent: Jun. 4, 2024

(54) GENERATING SIMULATED IMAGES THAT ENHANCE SOCIO-DEMOGRAPHIC DIVERSITY

(71) Applicant: Adobe Inc., San Jose, CA (US)

(72) Inventors: Ritwik Sinha, Cupertino, CA (US); Sridhar Mahadevan, Morgan Hill, CA (US); Moumita Sinha, Cupertino, CA (US); Md Mehrab Tanjim, San Diego, CA (US); Krishna Kumar Singh, San Jose, CA (US); David Arbour, San Jose, CA (US)

(73) Assignee: Adobe Inc., San Jose, CA (US)

( * ) Notice: Subject to any disclaimer, the term of this patent is extended or adjusted under 35 U.S.C. 154(b) by 330 days.

(21) Appl. No.: 17/485,780

(22) Filed: Sep. 27, 2021

(65) Prior Publication Data

US 2023/0094954 A1    Mar. 30, 2023

(51) Int. Cl.
*G06K 9/00*      (2022.01)
*G06F 18/214*    (2023.01)
(Continued)

(52) U.S. Cl.
CPC .......... *G06F 18/28* (2023.01); *G06F 18/2148* (2023.01); *G06N 3/045* (2023.01)

(58) Field of Classification Search
CPC ..... G06F 18/28; G06F 18/2148; G06N 3/045; G06N 3/0464; G06N 3/047; G06N 3/0475;
(Continued)

(56) References Cited

U.S. PATENT DOCUMENTS

| 7,437,344 | B2 * | 10/2008 | Peyrelevade | ........... G16Z 99/00 705/26.7 |
| 7,921,036 | B1 * | 4/2011 | Sharma | .............. G06Q 20/3674 705/52 |

(Continued)

OTHER PUBLICATIONS

Agustsson et al., Apparent and Real Age Estimation in Still Images with Deep Residual Regressors on Appa-Real Database, 2017 12th IEEE International Conference on Automatic Face & Gesture Recognition (FG 2017), May 2017, 8 pages.
(Continued)

*Primary Examiner* — Shervin K Nakhjavan
(74) *Attorney, Agent, or Firm* — Kilpatrick Townsend & Stockton LLP

(57) ABSTRACT

Methods and systems disclosed herein relate generally to systems and methods for generating simulated images for enhancing socio-demographic diversity. An image-generating application receives a request that includes a set of target socio-demographic attributes. The set of target socio-demographic attributes can define a gender, age, and/or race of a subject that are non-stereotypical for a particular occupation. The image-generating application applies the a machine-learning model to the set of target socio-demographic attributes. The machine-learning model generates a simulated image depicts a subject having visual characteristics that are defined by the set of target socio-demographic attributes.

19 Claims, 17 Drawing Sheets
(12 of 17 Drawing Sheet(s) Filed in Color)

(51) Int. Cl.
  *G06F 18/28* (2023.01)
  *G06N 3/045* (2023.01)
(58) Field of Classification Search
  CPC ........ G06N 3/084; G06N 3/088; G06N 3/094; G06V 10/776; G06V 10/772; G06V 10/774; G06V 10/82; G06V 40/172
  See application file for complete search history.

(56) References Cited

U.S. PATENT DOCUMENTS

| | | | | |
|---|---|---|---|---|
| 10,643,085 | B1* | 5/2020 | Kim | G06T 7/60 |
| 10,949,907 | B1* | 3/2021 | Jain | G06N 3/08 |
| 11,080,316 | B1* | 8/2021 | Das | G06F 16/434 |
| 11,354,683 | B1* | 6/2022 | Shin | G06Q 30/0201 |
| 11,386,306 | B1* | 7/2022 | Siddiquie | G06V 10/774 |
| 11,393,001 | B2* | 7/2022 | Joyce-Brady | G06F 16/535 |
| 11,443,462 | B2* | 9/2022 | Ge | G06V 10/82 |
| 11,645,521 | B2* | 5/2023 | Neumann | G06N 3/08 706/20 |
| 2016/0019411 | A1* | 1/2016 | Bart | G06V 20/30 382/118 |
| 2019/0045317 | A1* | 2/2019 | Badhwar | H04S 7/302 |
| 2021/0073595 | A1* | 3/2021 | Yamamoto | G06N 3/04 |
| 2021/0150249 | A1* | 5/2021 | Zheng | G06N 3/08 |
| 2021/0192186 | A1* | 6/2021 | Kim | G06V 40/165 |
| 2021/0241309 | A1* | 8/2021 | Wolf, Jr. | G06N 5/04 |
| 2021/0241350 | A1* | 8/2021 | Mane | G06Q 30/0631 |
| 2021/0264496 | A1* | 8/2021 | Claros | G06V 40/103 |
| 2021/0343063 | A1* | 11/2021 | Garbin | G06F 18/2135 |
| 2021/0366613 | A1* | 11/2021 | Schler | G06V 10/764 |
| 2022/0028139 | A1* | 1/2022 | Mitra | G06V 40/175 |
| 2022/0138454 | A1* | 5/2022 | Zhao | G06V 40/16 382/156 |
| 2022/0147769 | A1* | 5/2022 | Tran | G06V 10/82 |
| 2022/0172517 | A1* | 6/2022 | Kuta | H04L 63/0421 |
| 2022/0245912 | A1* | 8/2022 | Hu | G06V 20/64 |
| 2022/0258049 | A1* | 8/2022 | Kanani | G06Q 30/0621 |
| 2023/0040513 | A1* | 2/2023 | Ryan | G06V 20/52 |
| 2023/0186617 | A1* | 6/2023 | Karras | G06N 3/047 706/25 |

OTHER PUBLICATIONS

Brock et al., Large Scale GAN Training for High Fidelity Natural Image Synthesis, Available Online at: https://arxiv.org/pdf/1809.11096.pdf&org=deepmind, Feb. 25, 2019, pp. 1-35.

Celis et al., Implicit Diversity in Image Summarization, Proceedings of the ACM on Human-Computer Interaction, vol. 4, No. CSCW2, Oct. 2020, pp. 139.1-139.28.

Choi et al., StarGAN: Unified Generative Adversarial Networks for Multi-Domain Image-to-Image Translation, In Proceedings of the IEEE Conference on Computer Vision and Pattern Recognition, Jun. 2018, pp. 8789-8797.

Elkan, The Foundations of Cost-Sensitive Learning, In International Joint Conference on Artificial Intelligence, vol. 17, May 2001, 6 pages.

Goodfellow et al., Generative Adversarial Nets, Advances in Neural Information Processing Systems, vol. 27 (NIPS 2014), Jun. 2014, pp. 1-9.

He et al., Deep Residual Learning for Image Recognition, In Proceedings of the Institute of Electrical and Electronics Engineers Conference on Computer Vision and Pattern Recognition, Jun. 2016, pp. 770-778.

Heusel et al., GANs Trained by a Two Time-Scale Update Rule Converge to a Local Nash Equilibrium, 31st Conference on Neural Information Processing Systems, Available Online at: https://dl.acm.org/doi/pdf/10.5555/3295222.3295408, Dec. 2017, pp. 1-12.

Huang et al., Arbitrary Style Transfer in Real-Time with Adaptive Instance Normalization, In Proceedings of the IEEE International Conference on Computer Vision, Jul. 30, 2017, pp. 1-11.

Karako et al., Using Image Fairness Representations in Diversity-Based Re-Ranking for Recommendations, In Adjunct Publication of the 26th Conference on User Modeling, Adaptation and Personalization, Jul. 8-11, 2018, pp. 23-28.

Karkkainen et al., FairFace: Face Attribute Dataset for Balanced Race, Gender, and Age, 2021 IEEE Winter Conference on Applications of Computer Vision (WACV), Aug. 14, 2019, pp. 1-11.

Karkkainen et al., Fairface: Face Attribute Dataset for Balanced Race, Gender, and Age for Bias Measurement and Mitigation, In Proceedings of the IEEE/CVF Winter Conference on Applications of Computer Vision (WACV), Jan. 2021, pp. 1548-1558.

Karras et al., A Style-Based Generator Architecture for Generative Adversarial Networks, In Proceedings of the IEEE Conference on Computer Vision and Pattern Recognition, Jun. 2019, pp. 4401-4410.

Karras et al., Analyzing and Improving the Image Quality of StyleGAN, Conference: 2020 Institute of Electrical and Electronics Engineers/CVF Conference on Computer Vision and Pattern Recognition (CVPR), Mar. 23, 2020, pp. 1-21.

Karras et al., Progressive Growing of Gans for Improved Quality, Stability, and Variation, conference paper at ICLR, Oct. 27, 2017, pp. 1-25.

Karras et al., Training Generative Adversarial Networks with Limited Data, 34th Conference on Neural Information Processing Systems, Oct. 7, 2020, pp. 1-37.

Kay et al., Unequal Representation and Gender Stereotypes in Image Search Results for Occupations, CHI '15: Proceedings of the 33rd Annual ACM Conference on Human Factors in Computing Systems, Apr. 18-23, 2015, pp. 3819-3828.

King, Dlib-ml: A Machine Learning Toolkit, Journal of Machine Learning Research, vol. 10, Jul. 2009, pp. 1755-1758.

Li et al., Object-driven Text-to-Image Synthesis via Adversarial Training, IEEE/CVF Conference on Computer Vision and Pattern Recognition (CVPR), Feb. 2019, pp. 12174-12182.

Liang et al., CPGAN: Content-Parsing Generative Adversarial Networks for Text-to-Image Synthesis, In European Conference on Computer Vision, Jul. 12, 2020, pp. 1-18.

Liu et al., STGAN: A Unified Selective Transfer Network for Arbitrary Image Attribute Editing, In Proceedings of the IEEE conference on computer vision and pattern recognition, Apr. 22, 2019, 10 pages.

Mescheder et al., Which Training Methods for GANs do actually Converge?, Proceedings of the 35th International Conference on Machine Learning, Available online at: https://arxiv.org/pdf/1801.04406.pdf, Jul. 31, 2018, 39 pages.

Mirza et al., Conditional Generative Adversarial Nets, Available Online at: arXiv preprint arXiv:1411.1784, Nov. 6, 2014, pp. 1-7.

Yan et al., Attribute2Image: Conditional Image Generation from Visual Attributes, Springer, In European Conference on Computer Vision, Dec. 1, 2015, pp. 1-16.

Zhang et al., Age Progression/Regression by Conditional Adversarial Autoencoder, CVPR 2017, Mar. 28, 2017, pp. 1-9.

Zhu et al., DM-GAN: Dynamic Memory Generative Adversarial Networks for Text-to-Image Synthesis, Conference: 2019 IEEE/CVF Conference on Computer Vision and Pattern Recognition (CVPR), Apr. 2, 2019, pp. 1-9.

* cited by examiner

GENERATING SIMULATED IMAGES THAT ENHANCE SOCIO-DEMOGRAPHIC DIVERSITY

TECHNICAL FIELD

This disclosure generally relates to machine-learning techniques for generating simulated images. More specifically, but not by way of limitation, this disclosure relates to machine-learning techniques for generating simulated images that enhance socio-demographic diversity.

BACKGROUND

Due to existing socio-demographic stereotypes, images relating to certain social status or occupation tend to show biased content. For example, a query for an image of a plumber generates image results that that are mostly white males. The above example can imply a socio-demographic stereotype associated with the above occupation. These socio-demographic stereotypes also exist for other occupations, such as "carpenter," "machine operator," "administrative assistant," "cleaner," and so on. For these types of images, the search results can thus be biased towards certain types of gender, ethnicity, and age.

In effect, images of subjects that are not associated with certain socio-demographic stereotypes can be difficult to find. For example, a query for images of "female black machine operator" or "male Asian administrative assistant" does not generate enough search results. More often than not, the search results will show images that are biased towards socio-demographic stereotypes. It can thus be challenging for content providers to find or provide such images to end users.

Conventional techniques attempt to overcome these challenges using re-ranking algorithms. The re-ranking algorithms sort the search results, such that any images outside of these socio-demographic stereotypes can be shown as top search results. The conventional techniques, however, do not address the general unavailability of images with diverse socio-demographic backgrounds.

SUMMARY

Certain embodiments include an image-generating application that generates simulated images that enhance socio-demographic diversity. An image-generating application receives a request that includes a set of target socio-demographic attributes. The set of target socio-demographic attributes can define a gender, age, and/or race of a subject that are non-stereotypical for a particular occupation. The image-generating application applies the a machine-learning model to the set of target socio-demographic attributes. The machine-learning model generates a simulated image depicts a subject having visual characteristics that match one or more anatomical features. The visual characteristics of the subject are also defined by the set of target socio-demographic attributes. In various aspects, the machine-learning model was trained by: (i) oversampling training data through duplicating training images that are associated with the set of target socio-demographic attributes; and (ii) augmenting the oversampled training data to add variance to the simulated images.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
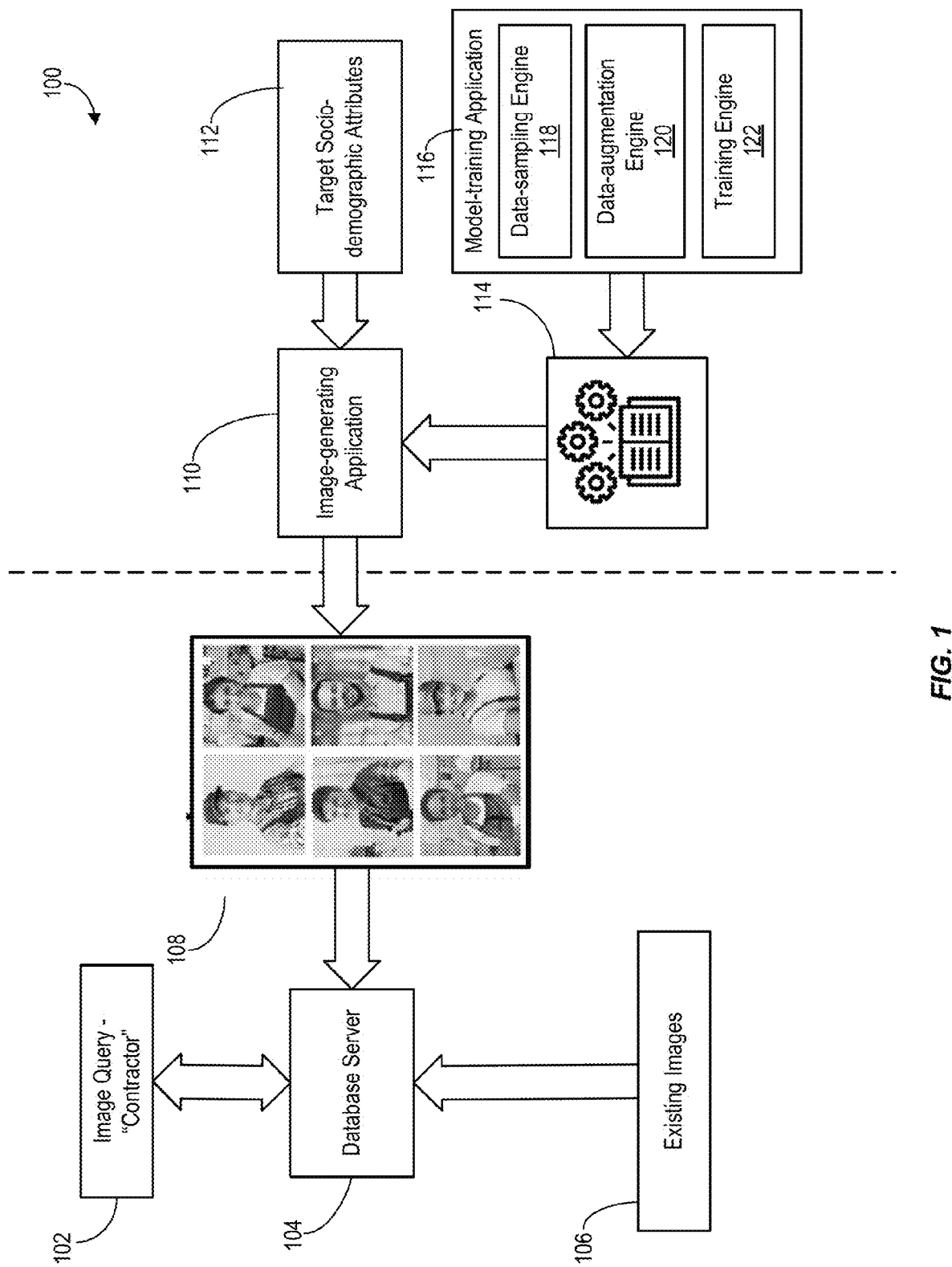
FIG. 1 shows a schematic diagram of a use case of a machine-learning technique for generating simulated images that enhance socio-demographic diversity, according to some embodiments.

Certain embodiments described herein can address one or more of the problems identified above by using a machine-learning model specifically trained to generate simulated images that enhance socio-demographic diversity. The machine-learning model can generate a simulated image depicts a subject having a gender, age, and/or race that is different from a known socio-demographic stereotype associated with a particular occupation.

In an illustrative example, an image-generating application receives a request to generate a simulated image of a subject. The request includes a set of target socio-demographic attributes, such as gender, race, age, and occupation. In this current example, a user submits a request to generate a simulated image, in which the request includes a target set of attributes that define one or more visual characteristics of an Asian female CEO.

The image-generating application applies a machine-learning model to the set of target socio-demographic attributes to generate the simulated image. The machine-learning model can be a generative adversarial network (GAN), which includes a generator component and a discriminator component. As described herein, the machine-learning model is specifically trained to generate simulated images that enhance socio-demographic diversity, even if the training data is biased towards a particular socio-demographic stereotype (e.g., a middle-aged white CEO).

Applying the machine-learning model includes the following steps. The generator component of the machine-learning model processes the embedding to generate a candidate simulated image. In this current example, a candidate simulated image is generated to depict a candidate subject having one or more candidate visual characteristics of an Asian female CEO.

The discriminator component of the machine-learning model processes the candidate simulated image to verify whether the candidate simulated image actually depicts the Asian female CEO. The discriminator component determines whether the one or more candidate visual characteristics accurately define a face, eyes, a nose, and a mouth of a human subject. The discriminator component also generates a set of predicted socio-demographic attributes that define the one or more candidate visual characteristics. In this current example, the set of predicted socio-demographic attributes identify visual features of an Asian female executive manager.

The discriminator component further determines whether the set of predicted socio-demographic attributes substantially match the set of target socio-demographic attributes. In this current example, the discriminator determines whether the set of predicted socio-demographic attributes identifying features of an Asian female executive manager substantially match the set of target socio-demographic attributes. Inaccurate candidate simulated images are rejected by the discriminator component, even if the image accurately depicts anatomical features of a human being.

If the set of predicted socio-demographic attributes substantially match the set of target socio-demographic attributes, the discriminator component classifies the candidate simulated image as the simulated image. The image-generating application then outputs the simulated image. The outputted simulated image can be used in various ways. In the current example, the image-generation application allows the user to and upload the simulated image to her website. The simulated image can be stored in a multimedia database that stores stock images of CEOs for later access.

Certain embodiments described herein provide improved machine-learning techniques for overcoming bias in training data and generating simulated images that that are outside of known socio-demographic stereotypes. To increase accuracy in generating the simulated images, modified weights are applied to the loss function to determine a modified loss. The modified loss is used in learning of the parameters to specifically address the bias in the training dataset. The accuracy can be further increased by: (i) oversampling the training data by generating duplicate copies of images that depict socially-diverse subjects; and (ii) augmenting the oversampled training data to add variance to the simulated images.

A. Definitions

"Socio-demographic attributes" refer to categorical values that define one or more visual characteristics of a subject of an existing image or a simulated image. For example, the socio-demographic attributes identifies race, age, gender, and/or occupation of the subject. In some instances, the socio-demographic attributes are defined to generate simulated images that enhance socio-demographic diversity in image content.

"Simulated image" refers to a new image generated by a machine-learning model. The simulated image depict image patterns that were learned during training the machine-learning model. However, the simulated image is not a duplicate copy of any training images in the training dataset used to train the machine-learning model.

"Augmentation" refers to a process of modifying pixels of an image to show various aspects thereof. For example, augmentation includes modifying orientation, pixel resolution, color, orientation, shape, position, contrast, and/or brightness of the image. In some instances, augmentation may result in cropping of a part of a subject depicted in the image. Augmentation can be performed one or more training images of a training dataset to reduce its class imbalance.

"Bias" or "class imbalance" refers to a classification problem where the distribution of training data across the known classes is biased or skewed towards a subset of classes. The distribution can vary from a slight bias to a severe imbalance. For example, a training image in a single minority class exists for hundreds, thousands, or millions of training images in the majority class or classes.

B. Overall Environment for Generating Simulated Images that Enhance Socio-Demographic Diversity Machine-learning models are trained and used to generate simulated images that enhance socio-demographic diversity. The machine-learning models are trained to generate the simulated images by modifying and augmenting training datasets that are initially biased towards a particular socio-demographic stereotype. The simulated images can be a part of search-engine results, in response to a search-engine query submitted by a user device. Because the simulated images specifically correspond to non-stereotypical subjects (e.g., Asian female CEOs), the search-engine results can provide more socially diverse content or provide content that would otherwise not be readily available to the users.

1. Example Implementation

FIG. 1 shows a schematic diagram 100 of a technique for generating simulated images that enhance socio-demographic diversity, according to some embodiments. The schematic diagram 100 includes a query 102 submitted by a user device to a multimedia database 104, in order to retrieve a set of images relating to a particular occupation (e.g., a contractor). The multimedia database server 104 accesses, from an image repository (not shown) storing a plurality of images across various occupations, a set of existing images 106 that correspond to a contractor. As explained above, the set of existing images 106 can be biased towards a particular socio-demographic stereotype. To reduce such bias and enhance socio-demographic diversity, a set of simulated images 108 can be added to the multimedia database 104.

To generate the set of simulated images 108, an image-generating application 110 accesses a set of target socio-demographic attributes 112, including race, age, gender, and/or occupation. A machine-learning model 114 is applied to the set of target socio-demographic attributes 112. For example, the machine-learning model is a trained GAN, which includes a generator component and a discriminator component. The machine-learning model is specifically trained by a model-training application 116 to generate simulated images that enhance socio-demographic diversity, even if the training data would be biased towards a particular socio-demographic stereotype (e.g., the set of existing images 106 that identify white male contractors). This can be realized through a combination of training techniques, including: (1) modified loss function; (2) oversampling of training dataset; and (3) augmentation of training dataset.

The model-training application 116 includes one or more components that are used to train the machine-learning model. The model-training application 116 includes a data-sampling engine 118 that receives a plurality of images used for training the machine-learning model. Each image of the plurality of images depicts a human subject. The data-sampling engine 118 pre-processes the plurality of images by generating a set of training images. The set of training images include one or more duplicate copies of a training image being associated with a set of target socio-demographic attributes and/or a subject outside of a particular socio-demographic stereotype.

The model-training application 116 also includes a data-augmentation engine 120. The data-augmentation engine 120 receives receive the set of training images from the data-sampling engine and generates, based on the set of training images, a set of augmented training images. The set of augmented training images include one or more augmented copies of each training image of the set of training images. An augmented copy of the one or more augmented copies can be generated by modifying a color and/or orientation of the training image being associated with the set of target socio-demographic attributes.

The model-training application 116 also includes a training engine 122. The training engine 122 receives the set of augmented training images from the data-augmentation engine 120. The training engine 122 processes each augmented training image of the set of augmented training images to train the machine-learning model to generate a simulated image depicting a subject that has one or more visual characteristics defined by the set of target socio-demographic attributes (e.g., a female plumber). After the training phase is complete, the training engine 122 provides the trained-machine learning model for use by other applications or systems (e.g., the image-generating application 110).

By receiving the set of simulated images 108, the multimedia database server 104 can output a response to the search query that include a set of socially-diverse images that respectively depict a contractor. In some instances, if the query 102 specifies a "female contractor," the multimedia database server 104 outputs at least one simulated image of the set of simulated images 108, in which the simulated image depicts a female contractor.

Figure 2:
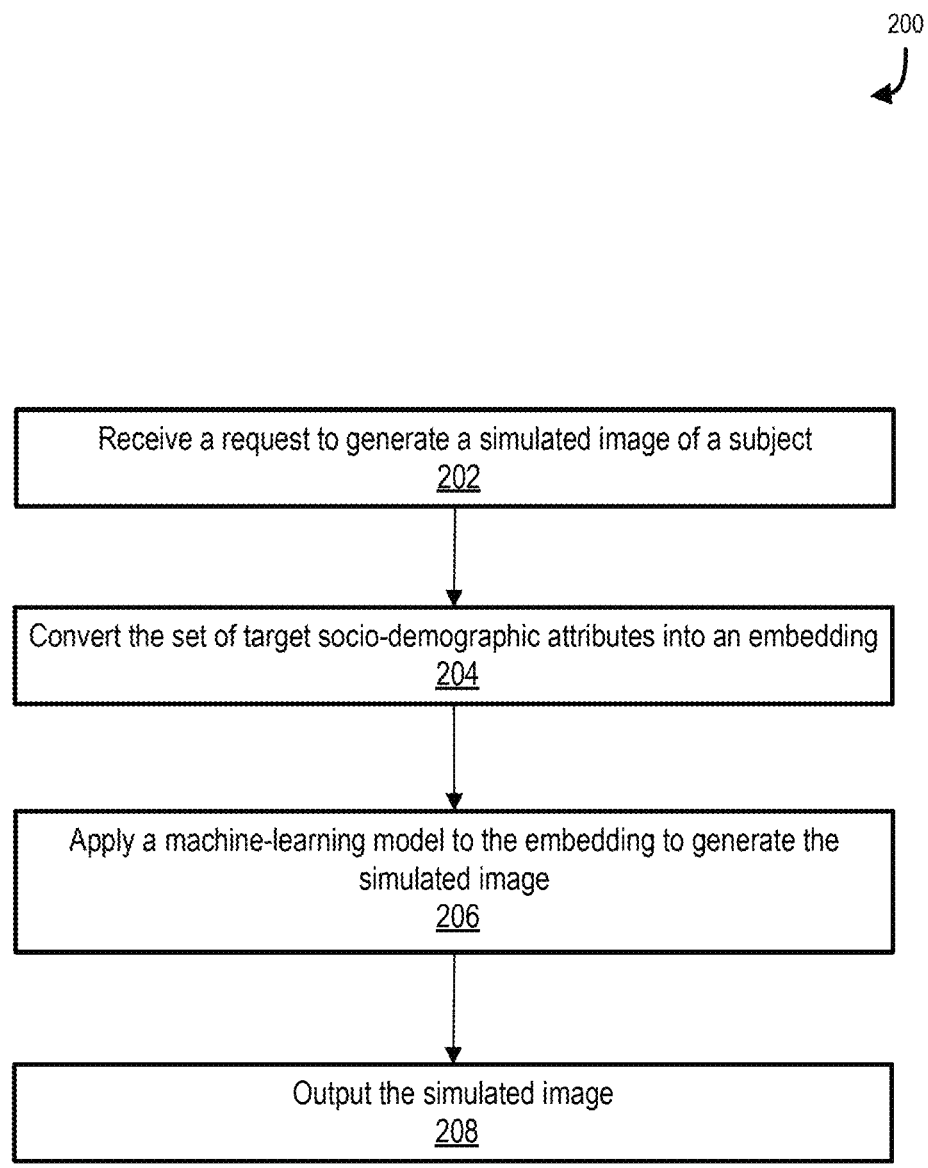
FIG. 2 shows a process for generating simulated images that enhance socio-demographic diversity, according to some embodiments.

2. Process for Generating Simulated Images that Enhance Socio-Demographic Diversity FIG. 2 shows a process for generating simulated images that enhance socio-demographic diversity, according to some embodiments. For illustrative purposes, the process 200 is described with reference to the components illustrated in FIG. 1, though other implementations are possible. For example, the program code for an image-generating application 110 of FIG. 1, which is stored in a non-transitory computer-readable medium, is executed by one or more processing devices to cause a server system to perform one or more operations described herein.

At step 202, an image-generating application receives a request to generate a simulated image of a subject. In some instances, the request includes a set of target socio-demographic attributes that define one or more visual characteristics of the subject. The set of target socio-demographic attributes include age, gender, race, and/or an occupation of the subject.

At step 204, the image-generating application converts the set of target socio-demographic attributes into an embedding. The image-generating application converts the set of target socio-demographic attributes into the embedding by generating a feature vector that represents the set of target socio-demographic attributes. The image-generating application accesses a latent code. The image-generating application applies one or more feed-forward neural networks to the feature vector and the latent code to generate the embedding.

At step 206, the image-generating application applies a machine-learning model to the embedding to generate the simulated image. In some instances, the machine-learning model is a generative adversarial network. The machine-learning model was trained using a training dataset comprising a plurality of training images. In some instances, the plurality of training images include one or more duplicate copies of a training image being associated with the set of target socio-demographic attributes. Additionally or alternatively, the plurality of training images include one or more augmented copies of a training image being associated with the set of target socio-demographic attributes. An augmented copy of the one or more augmented copies can be generated by modifying a color and/or orientation of the training image being associated with the set of target socio-demographic attributes.

Applying the machine-learning model includes the following steps. A generator component of the machine-learning model processes the embedding to generate a candidate simulated image. The candidate simulated image depicts a candidate subject represented by one or more candidate visual characteristics.

A discriminator component of the machine-learning model then processes the candidate simulated image. The discriminator component is configured to: (i) determine that the one or more candidate visual characteristics depict one or more anatomical features; and (ii) generate a set of predicted socio-demographic attributes that define the one or more candidate visual characteristics.

The discriminator component further determines whether the set of predicted socio-demographic attributes substantially match the set of target socio-demographic attributes. In particular, the discriminator component determines a loss between the set of predicted socio-demographic attributes and the set of target socio-demographic attributes. To determine the loss, the discriminator component generates a first logit value representing the set of predicted socio-demographic attributes and a second logit value representing the set of target socio-demographic attributes.

Then, the discriminator inputs the first and second logit values to a modified loss function to determine the loss to determine a loss (e.g., a classification loss). In some instances, the modified loss function is configured to increase a probability of the candidate simulated image to depict the candidate subject having the one or more visual characteristics. Additionally or alternatively, the discriminator modifies one or more parameters of the discriminator component based on the determined loss to train the machine-learning model.

The determined loss is compared to a particular threshold. If the determined loss is under the particular threshold, the discriminator component determines that the set of predicted socio-demographic attributes substantially match the set of target socio-demographic attributes. In this current example, the discriminator component classifies the candidate simulated image as the simulated image after determining that the determined loss between the set of predicted socio-demographic attributes and the set of target socio-demographic attributes is under the threshold.

In response to determining that the set of predicted socio-demographic attributes substantially match the set of target socio-demographic attributes, the discriminator component classifies the candidate simulated image as the simulated image. As a result, the machine-learning model generates the simulated image that enhances socio-demographic diversity.

At step 208, the image-generating application outputs the simulated image. Process 200 terminates thereafter.

C. Overall Environment for Training a Machine-Learning Model to Generate Simulated Images that Enhance Socio-Demographic Diversity As stated above, it is challenging to train a machine-learning model when an objective of a particular task is unlikely to fulfilled based on the available training dataset. Enhancing socio-demographic diversity in images can be an example of such challenging, in which existing images corresponding to a particular socio-demographic attribute (e.g., a plumber) are heavily biased towards to another socio-demographic attribute (e.g., a white male).

The machine-learning model for enhancing socio-demographic diversity is trained in a manner that increases accuracy of the simulated image depicting diverse subjects. For example, weights are modified then applied to logit values outputted by the discriminator component. The modified weights can allow the loss function to determine a modified loss. The modified loss is used in learning of the parameters to specifically address the class imbalance in training dataset. The accuracy of the machine-learning model can be further increased by: (i) oversampling the training data by generating duplicate copies of images that depict socially-diverse subjects; and (ii) augmenting each of the images that depict socially-diverse subjects.

1. Example Implementation

Figure 3:
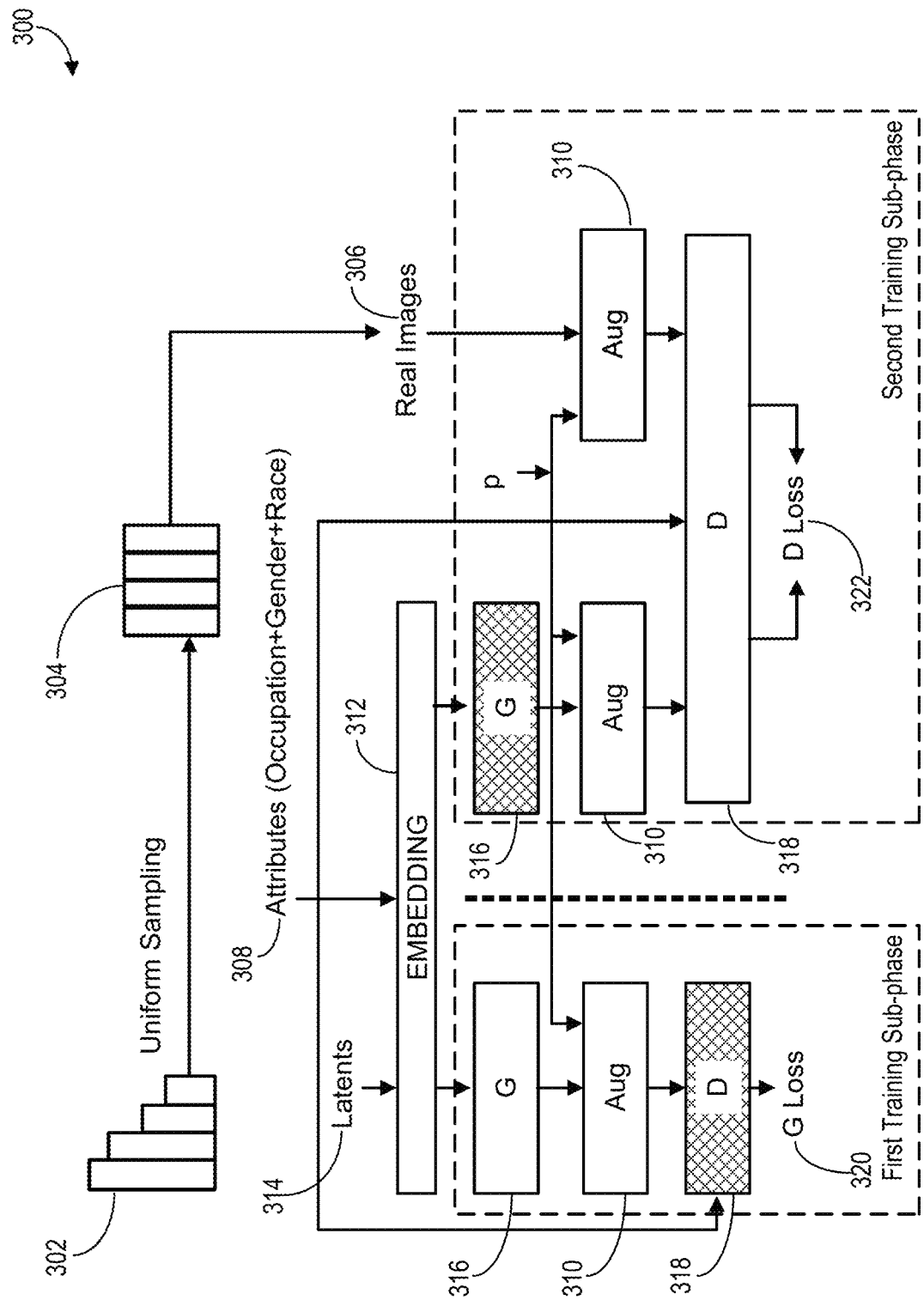
FIG. 3 illustrates a schematic diagram for training a machine-learning model to generate simulated images that enhance socio-demographic diversity, according to some embodiments.

FIG. 3 illustrates a schematic diagram 300 for training a machine-learning model to generate simulated images that enhance socio-demographic diversity, according to some embodiments. The schematic diagram includes a plurality of images 302 that are considered as candidate training images for training a machine-learning model (e.g., a GAN). Each image of the plurality of images 320 depicts a subject having one or more visual characteristics. The one or more visual characteristics may define a set of socio-demographic attributes, including gender, age, race, and/or occupation. In some instances, images having a particular socio-demographic attribute (e.g., a plumber) are more frequently correlated with one or more other socio-demographic attributes (e.g., male). Such correlation results in a class imbalance in the plurality of images 302.

The training phase includes a data-sampling engine of a model-training application sampling the plurality of images 302 to generate a training dataset 304. The training dataset 304 includes a set of images that are sampled to enhance socio-demographic diversity. For example, the training dataset 304 includes one or more duplicate copies of each image that depicts subjects outside of a socio-demographic stereotype. In effect, the training dataset 304 includes an increased quantity of images that depict socially-diverse subjects, which allows the machine-learning model to be trained to generate simulated images that enhance socio-demographic diversity.

The training dataset 304 includes two types of training data: (i) a set of training images 306; and (ii) sets of training socio-demographic attributes 308. In particular, each set of training socio-demographic attributes corresponds to a training images of the set of training images 306. Each type of training data in the training dataset 304 can be inputted differently to train the machine-learning model. For example, the sets of training socio-demographic attributes 308 are used as input to train a generator component of the machine-learning model. In another example, the set of training images 306 and the sets of training socio-demographic attributes 308 are both used as inputs to train a discriminator component of the machine-learning model.

In some instances, the training dataset 304 causes an overfitting problem while training the machine-learning model. Overfitting occurs when parameters of the machine-learning model learn the detail and noise in the training dataset 304 to the extent that it negatively impacts the performance of the model on new data. The overfitting problem could be attributed to the oversampling of the training images, and can be addressed by implementing data augmentation. A data-augmentation engine 310 of the model-training application receives images (e.g., the set of training images 306). The data-augmentation engine 310 selects, from the images, one or more images that depict subjects outside of a socio-demographic stereotype and/or are associated with a set of target socio-demographic attributes. The data-augmentation engine 310 generates one or more augmented copies of each of the selected images by modifying color, orientation, contrast, brightness, and/or position of a corresponding subject, thereby forming a set of augmented training images. The set of augmented training images are used to train the generator component and the discriminator component of the machine-learning model.

After the training dataset is pre-processed, the model-training application begins training the machine-learning model. The training phase includes two sub-phases: (i) a first training sub-phase; and (ii) a second training sub-phase. The first training sub-phase involves a training engine of the model-training application training a generator component 316. To implement the first training sub-phase, the training engine generates a set of embeddings 312 based on the sets of training socio-demographic attributes 308. Each embedding of the set of embeddings 312 is generated from a feature vector that represents a corresponding set of training socio-demographic attributes of the training dataset 304. In some instances, a feature vector is processed with one or more latent codes 314 to generate the embedding. The latent codes are used to add variability to the simulated images, so as to avoid all simulated images to appear the same when they are generated to match the target set of attributes. Additionally or alternatively, the training engine applies one or more additional machine-learning models (e.g., a feed-forward neural network) to generate the set of embeddings 312.

The generator component 316 generates a simulated image for each of the set of embeddings 312. The data-augmentation engine 310 then augments the simulated image, thereby generating one or more augmented copies of the simulated image. The augmentation of the simulated image is performed so as to calculate multiple losses corresponding to simulated images depicting socially-diverse subjects. The augmentation of the simulated images can thus accelerate the training of the generator component 316. During the first training sub-phase, a discriminator component 318 is "frozen," which refers to a training technique in which parameters of the discriminator component 318 are prevented from being modified. The freezing of the discriminator component 318 accelerates learning of the parameters of the generator component 316. The first training sub-phase further includes transmitting the simulated images (including the augmented simulated images) to the "frozen" discriminator component.

The frozen discriminator component 318 calculates a first loss between each of the simulated images and a corresponding training image of the set of training images 308, in which the first loss identifies a difference between visual characteristics of the simulated image and the corresponding training image. The logit values are generated by applying a logit function to an output generated by the discriminator component 318.

In addition to the first loss, the discriminator component 318 calculates a second loss between each of the simulated images and a corresponding training image of the set of training images 308, in which the second loss identifies a difference between the set of predicted socio-demographic attributes of the simulated image and the set of training socio-demographic attributes for the corresponding training image. A total loss 320 is derived from the calculated first and second losses. The total loss 320 is then used to modify parameters of the generator component 316, such that the parameters are learned to minimize the total loss 320. The loss minimization can be performed by applying the total loss 1124 to a gradient descent algorithm (for example). The training of the discriminator component 318 is determined to be successful if the total loss 320 decreases to become a value that is under a particular threshold.

The second training sub-phase involves the training engine of the model-training application training the discriminator component 318. To implement the second training sub-phase, the training engine uses the set of embeddings 312. Similar to the embeddings used for the first training sub-phase, each embedding of the set of embeddings 312 is generated from a feature vector that represents a corresponding set of training socio-demographic attributes of the training dataset 304. In some instances, a feature vector is processed with one or more latent codes 314 to generate the embedding. The training engine can generate the set of embeddings 312 using the feed-forward neural network.

The discriminator component 318 receives, for each of the set of embeddings 312, a simulated image generated by the generator component 316 or an augmented copy of the simulated image generated by the data-augmentation engine 310. The augmentation of the simulated image is performed so as to calculate multiple losses corresponding to simulated images depicting socially-diverse subjects. The augmentation of the simulated images can also accelerate the training of the discriminator component 318. During the second training sub-phase, the generator component 316 is "frozen," such that parameters of the generator component 316 are prevented from being modified. The freezing of the generator component 316 accelerates learning of the parameters of the discriminator component 318. The discriminator component 318 generates a set of predicted socio-demographic attributes of each simulated image. This is to ensure that the simulated not only depicts accurate anatomical features of the subject, but also depicts a subject that is outside of the socio-demographic stereotype.

Continuing with the second training sub-phase, the discriminator component 318 calculates a first loss between each of the simulated images and a corresponding training image of the set of training images 308, in which the first loss identifies a difference between visual characteristics of the simulated image and the corresponding training image. Similar to above, the first loss can be calculated by identifying a difference between a first logit value of the simulated image and a second logit value of the corresponding training image.

In addition to the first loss, the discriminator component 318 calculates a second loss between each of the simulated images and a corresponding training image of the set of training images 308, in which the second loss identifies a difference between the set of predicted socio-demographic attributes of the simulated image and the set of training socio-demographic attributes for the corresponding training image. A total loss 322 is derived from the calculated first and second losses. The total loss 322 is then used to modify parameters of the discriminator component 318, such that the parameters are learned to minimize the total loss 322. The loss minimization can be performed by applying the total loss 1124 to a gradient descent algorithm (for example). The training of the discriminator component 318 is determined to be successful if the total loss 322 decreases to become a value that is under a particular threshold.

After the generator component 316 and the discriminator component 318 have completed the training, the machine-learning model is deployed for generation of simulated images that enhance socio-demographic diversity.

Figure 4:
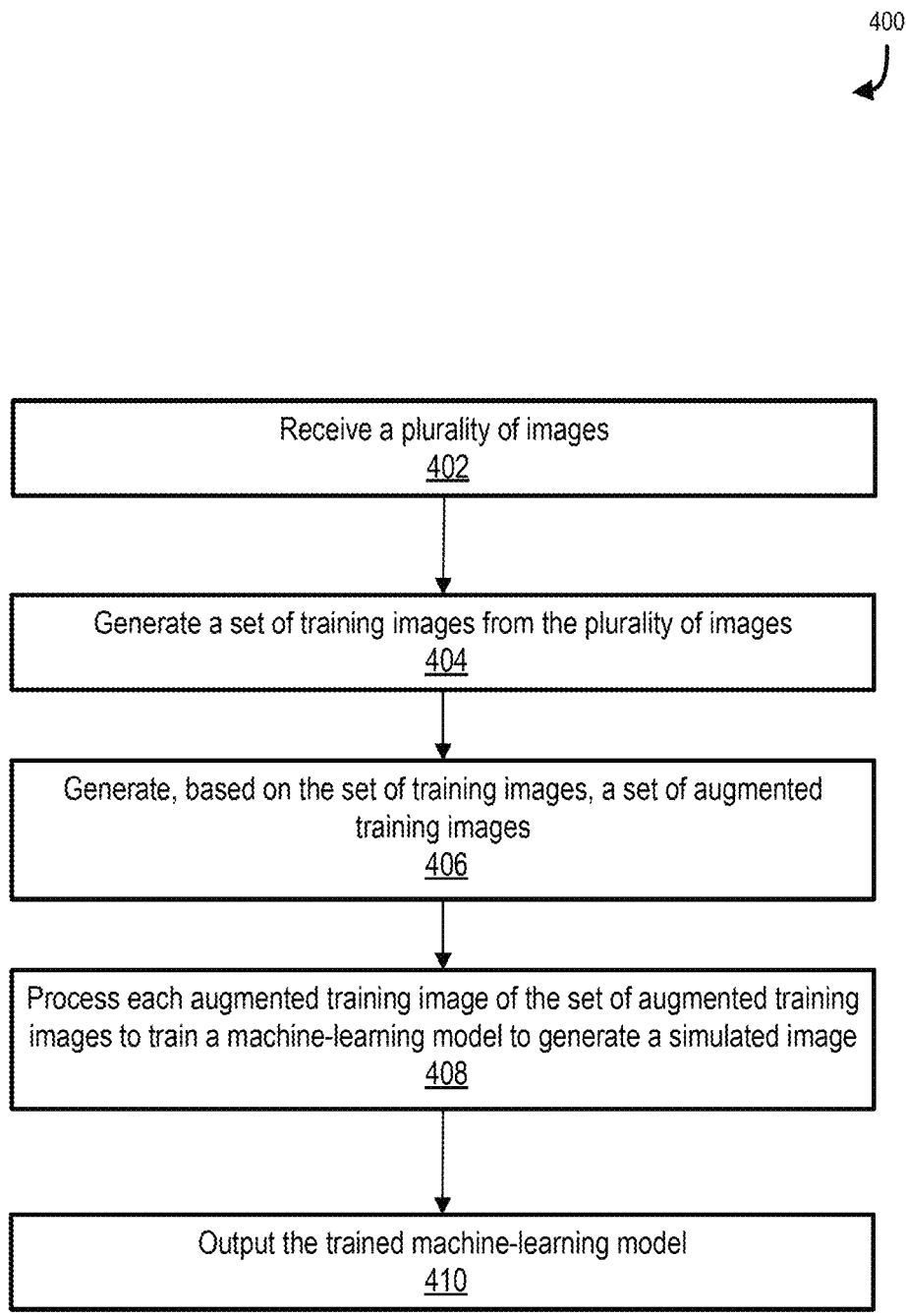
FIG. 4 shows a process for generating simulated images that enhance socio-demographic diversity, according to some embodiments.

2. Process for Training a Machine-Learning Model to Generate Simulated Images that Enhance Socio-Demographic Diversity FIG. 4 shows a process 400 for generating simulated images that enhance socio-demographic diversity, according to some embodiments. For illustrative purposes, the process 400 is described with reference to the components illustrated in FIG. 1, though other implementations are possible. For example, the program code for a model-training application 116 of FIG. 1, which is stored in a non-transitory computer-readable medium, is executed by one or more processing devices to cause a server system to perform one or more operations described herein.

At step 402, the model-training application receives a plurality of images. In some instances, each image of the plurality of images depict a respective subject.

At step 404, the model-training application generates a set of training images from the plurality of images. The set of training images include one or more duplicate copies of a training image being associated with a set of target socio-demographic attributes. The set of target socio-demographic attributes can include age, gender, race, and/or an occupation of the subject.

At step 406, the model-training application generates, based on the set of training images, a set of augmented training images. The set of augmented training images include one or more augmented copies of each training image of the set of training images. In some instances, the augmented training image is generated by modifying color, orientation, contrast, brightness, and/or position of a corresponding training image.

At step 408, the model-training application processes each augmented training image of the set of augmented training images to train a machine-learning model (e.g., a GAN) to generate a simulated image. The simulated image depicts a subject that has one or more visual characteristics defined by the set of target socio-demographic attributes. To address bias in the training dataset, the machine-learning model is trained using a modified loss function, which is configured to increase a probability of the simulated image depicting the subject with socially diverse attributes.

In some instances, the machine-learning model is trained based on an embedding of each augmented training image as input. The model-training application generates the embedding by generating a feature vector that represents the augmented training image, accessing a latent code, and applying one or more feed-forward neural networks to the feature vector and the latent code to generate the embedding.

Training of the machine-learning model can include two training phases. The first training phase includes training of a generator component of the machine-learning model. To train the machine-learning model, the model-training application generates an embedding for each of the set of augmented training images. The model-training application uses each embedding to train the generator component of the machine learning model, in which the generator component generates a candidate simulated image. In some instances, the candidate simulated image depicts a candidate subject represented by one or more candidate visual characteristics. The generator component is trained to generate simulated images that accurately depict a socially-diverse subject, based on a loss generated by a discriminator component of the machine-learning model. In particular, the loss generated by the discriminator component is used for learning of one or more parameters of the generator component.

Continuing from the above example, the second training phase includes training of the discriminator component of the machine-learning model. The discriminator component receives the candidate simulated image from the generator component. The discriminator component is trained to determine whether that the one or more candidate visual characteristics depict one or more anatomical features of a subject (e.g., a nose, a mouth, ears, eyes). The training of the discriminator component to perform the above determination includes calculating a first loss between the one or more candidate visual characteristics and the one or more anatomical features of the subject. The first loss is used to modify one or more parameters of the discriminator component.

In addition, the discriminator component is trained to generate a set of predicted socio-demographic attributes that define the one or more candidate visual characteristics. For example, the set of predicted socio-demographic attributes includes a predicted age, gender, race, and/or occupation associated with the candidate image. The discriminator component is further trained to determine whether the set of predicted socio-demographic attributes substantially match the set of target socio-demographic attributes. The training of the discriminator component to perform the above determination includes calculating a second loss between the set of predicted socio-demographic attributes and the set of target socio-demographic attributes. The second loss is also used to modify the one or more parameters of the discriminator component.

The discriminator component is thus trained to, in response to determining that the set of predicted socio-demographic attributes substantially match the set of target socio-demographic attributes, classify the candidate simulated image as the simulated image.

At step 410, the model-training application outputs the trained machine-learning model. The trained machine-learning model can be used by other applications and systems (e.g., the image-generating application of FIG. 1) to generate simulated images that enhance socio-demographic diversity. In some instances, the machine-learning model continues to be trained while it generates the simulated images for the end user.

Figure 5:
FIG. 5 shows an example set of images that are biased towards socio-demographic stereotypes.

D. Preliminary Considerations for Generating Simulated Images that Enhance Socio-Demographic Diversity As explained herein, existing image repositories include images that can be biased towards a certain socio-demographic stereotype or class. FIG. 5 shows an example set of images 500 that are biased towards socio-demographic stereotypes. To characterize the gender bias in image search results for a variety of occupations, a study was performed to obtain top 400 image results for 96 occupations using search-engine queries. The image results were labeled based on their respective socio-demographic attributes. The image results showed that the percentage of images of women in 2014 results was 37%, and the fraction of gender anti-stereotypical images was only 22%. A more recent study was performed to show that socio-demographic diversity in search has improved in the last five years, but not too significantly. For example, the study shows that the percentage of female participants has risen to 45% in 2019, but the fraction of anti-stereotypical images has remained low (30%). As shown in FIG. 5, a query "plumber" does not generate any search results that identify a female plumber.

Figure 6:
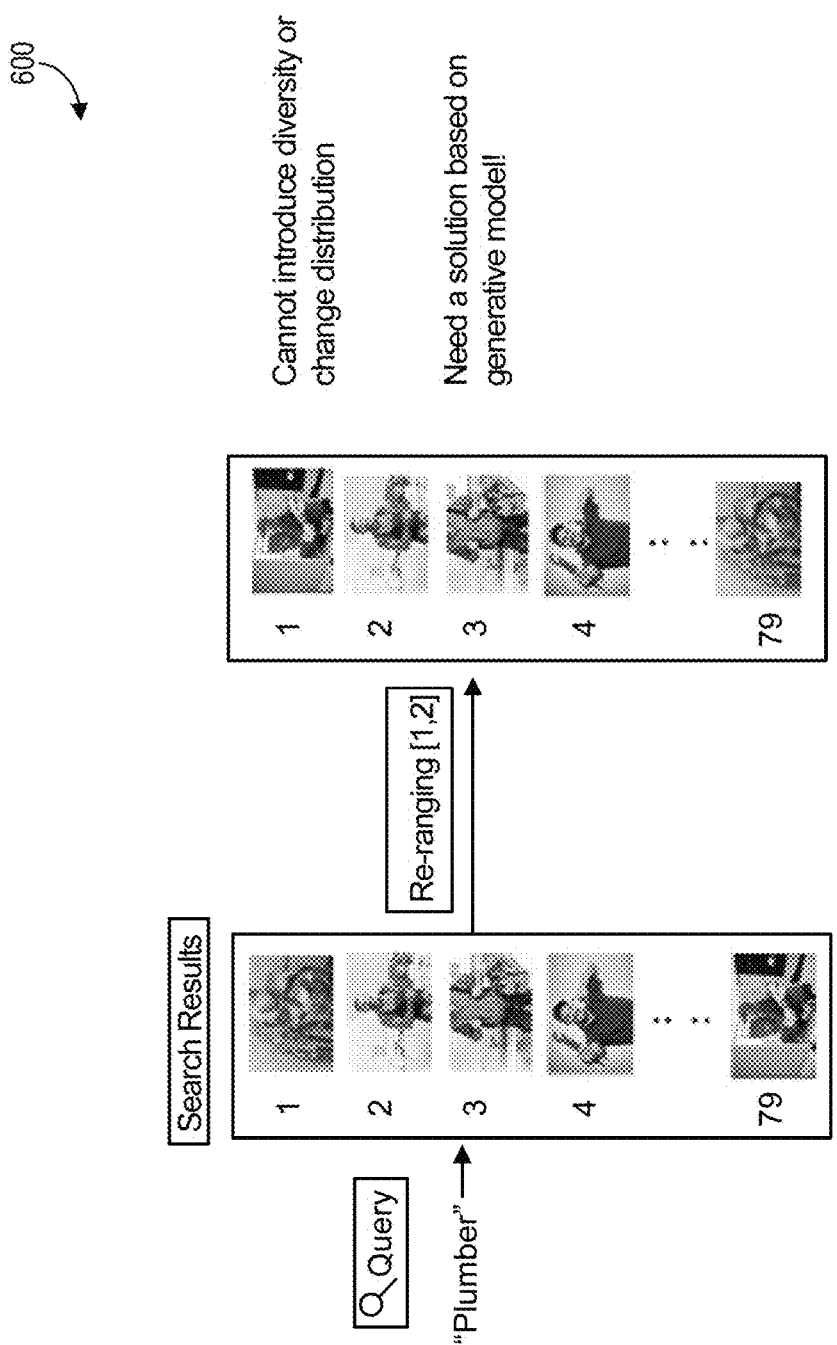
FIG. 6 shows a schematic diagram of a conventional technique for reducing socio-demographic bias in multimedia content.

To mitigate such bias in search results, conventional techniques focus on developing re-ranking algorithms that can show diversity in the top search results. The re-ranking algorithms sort the search results, such that any images outside of these socio-demographic stereotypes can be shown as top search results. For example, a study proposed a Fairness Maximal Marginal Relevance (FMMR) retrieval algorithm to reflect diversity in the top image search results. Similar work was done by another study. FIG. 6 shows a schematic diagram 600 of a conventional technique for reducing socio-demographic bias in multimedia content.

However, the above techniques can only mitigate bias in the top results by re-ranking if many diverse images relevant to the query already exist. This may not hold for combinations of socio-demographic attributes that are less common in certain occupations. When these images do not exist, or only a few of them do, it becomes challenging for the above techniques to diversify the search results.

1. Attribute-to-Image Synthesis Models

In the presence of such paucity of socially-diverse images (e.g., FIG. 6), current bias-mitigating re-ranking algorithms are not helpful because they cannot create new content nor change the overall distribution. For example, if there is only one picture of a "male Asian administrative assistant," existing strategies will not help the user experience. To address this challenge, machine-learning models can be used to generate photo-realistic, high-resolution simulated images for such queries. Generating these simulated images can enrich the user experience if end users can access new multimedia content for any combination of attributes.

In recent years, GANs have become a popular machine-learning technique in the domain of image generation. GANs were initially developed to unconditionally generate images from random noise. To exert control over the generation process, GANs conditioned on class labels or text input have been proposed and implemented. As GANs allow explicit control of generation processing using attributes, they can potentially be applied to generate simulated images. Conventional GANs, however, tend to lack the ability to produce images at high-resolution, which can be a requirement for content providers.

2. High-Quality Image Generation Using Generative Adversarial Networks

For content providers, the resolution of stock images needs to be as high as possible (preferably 1024×1024). Generating such high-quality images, however, is significantly difficult because, at high-resolution, it becomes easier for a discriminator of GAN to tell the fake images (e.g., simulated images generated by A generator of GAN) from real images. To stabilize the training phase, a progressive GAN has been proposed, in which the training of the progressive GAN involves progressively increasing the resolution of both generator and discriminator components (e.g., from 4×4 to 1024×1024). However, a likely problem of such scheme is feature entanglement. For example, the generated images lock features together (e.g., face), which makes it difficult to modify one of the features (e.g., eyes) independently from the rest of the features. To address this problem, StyleGAN and StyleGAN2 both attempt to combat this entanglement problem by introducing a mapping network and adaptive instance normalization (AdaIN) into the progressive GAN. These models are also style-based generators. That is, they can learn to map features or "styles" from a dataset to a disentangled latent space. These mapped features are used to visualize people in different jobs, since each job has its unique attire or style. Therefore, these models have potential to combat the socio-demographic bias problem in images.

However, both StyleGAN and StyleGAN2 learn disentangled representations from images without any supervision and do not allow explicit control over attributes. Attribute control is needed, such that the simulated images can enhance socio-demographic diversity. Furthermore, they do not have any built-in mechanism that allows them to train under a class imbalance, where only a few examples exist for certain combinations of attributes. In this disclosure, these challenges in the proposed task are overcome.

E. Training Data Preparation

Due to the socio-demographic bias in certain groups of images, existing training datasets would not effectively train the machine-learning model to generate the simulated images that enhance socio-demographic diversity. Thus, a training dataset is built specifically to train the machine-learning model. In the following sections, collection, pre-processing, and annotation of the training images are discussed.

1. Collection

To obtain images for different occupations, a search query is constructed. In some instances, a set of target socio-demographic attributes are selected to enhance diversity on professions that show the most racial and gender bias. Example of such professions include the following: "executive manager," "administrative assistant," "nurse," "farmer," "military person," "security guard," "truck driver," "cleaner," "carpenter," "plumber," "machine operator," "technical support person," "software engineer," "writer." A plurality of raw images (e.g., 10,000 images) are collected across the above professions. In addition to showing bias, the 14 professions also have been chosen primarily because of their distinct styles or attires (around 95% accuracy for top-3 prediction has been observed when a classifier has been trained on them).

2. Preprocessing

Figure 7:
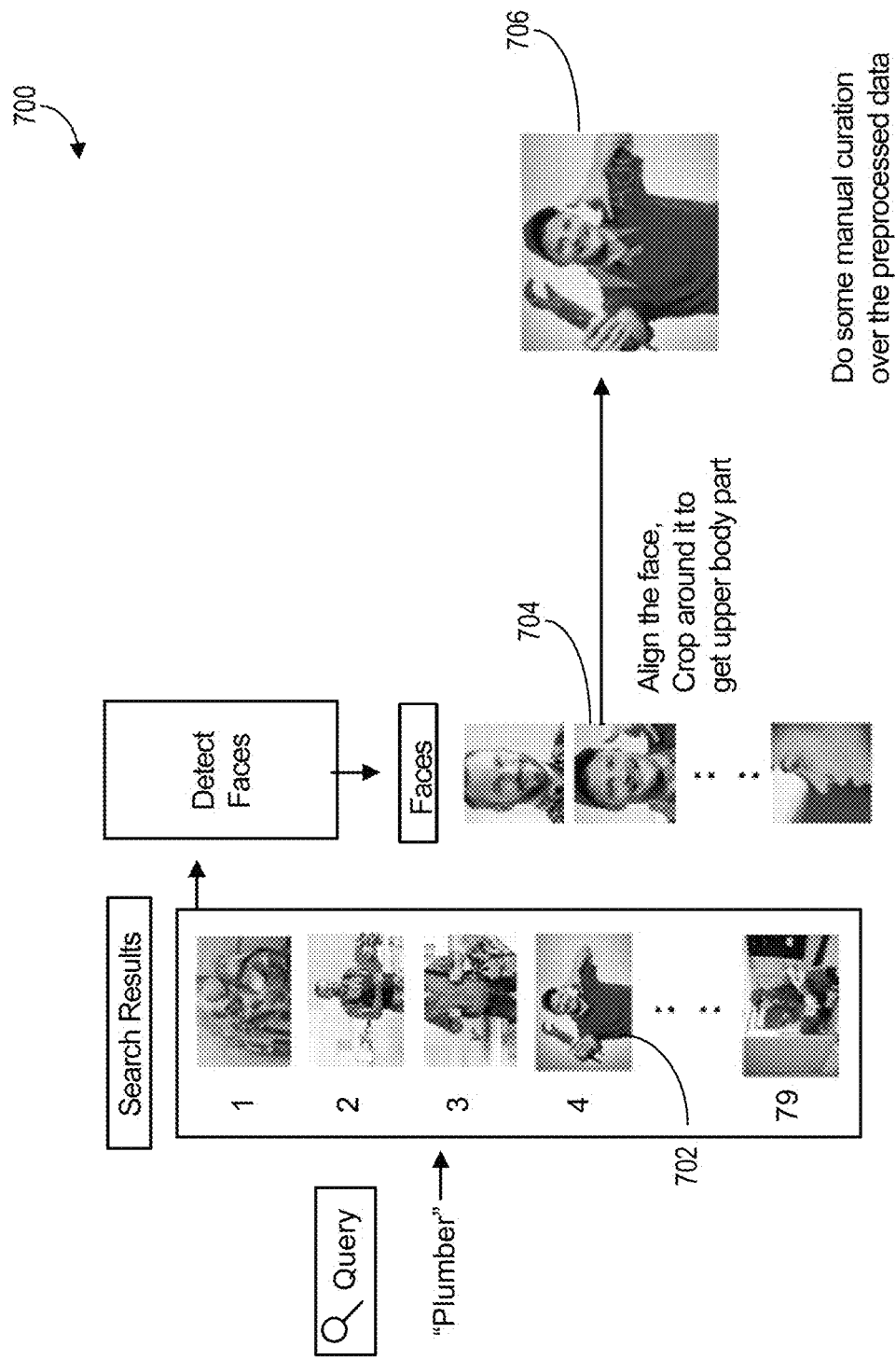
FIG. 7 shows a schematic diagram for preprocessing raw images to generate a training dataset, according to some embodiments.

FIG. 7 shows a schematic diagram 700 for preprocessing raw images to generate a training dataset, according to some embodiments. For example, the model-training application processes each raw image 702 to generate a pre-processed training image 704. The pre-processed training image 704 depicts a face of the respective subject of the raw image 702, while cropping other image regions. In some instances, the face detection is performed by applying another machine-learning model (e.g., a convolutional neural network) to the raw image 702. The pre-processed image 704 facilitates annotation of a corresponding training image or additional modifications (e.g., alignment, cropping, rotation) of the raw image 702. As an example, a cropped image 706 of the raw image 702 is generated, in which background image regions have been removed.

In some instances, the face detection is performed by using a face detector algorithm and applying a custom-padding process so as to crop the image around the face and include the upper body portion of each image (e.g., the raw image 702). The generation of the pre-processed training images removes noise while allowing visual characteristics of the subject including race, age, gender, and accessories/attires of different occupations to stay intact. Additionally or alternatively, manual curation is performed to remove generic photos or images that are not representative of the occupation.

3. Annotating

Figure 8:
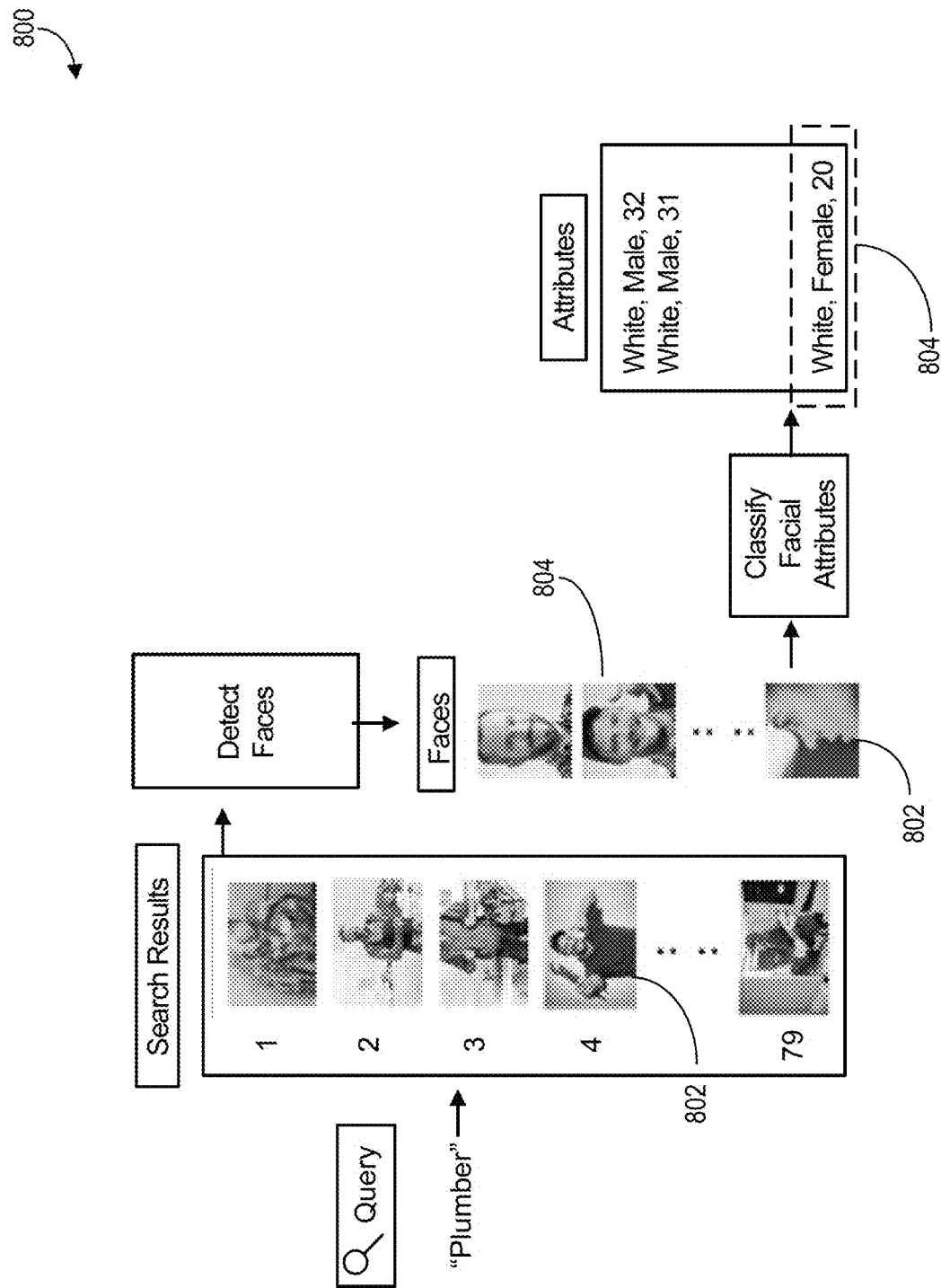
FIG. 8 shows a schematic diagram for annotating preprocessed images to generate a training dataset, according to some embodiments.

FIG. 8 shows a schematic diagram 800 for annotating preprocessed images to generate a training dataset, according to some embodiments. For example, a preprocessed image 802 depicting a female's face is annotated by identifying its facial attributes. The annotations identify a set of training socio-demographic attributes 804. The set of socio-demographic attributes define visual characteristics (e.g., race, gender, age, occupation) associated with the preprocessed image 802. In some instances, annotations are performed manually (e.g., by a user). Additionally or alternatively, the annotations for generating the set of training socio-demographic attributes 804 are performed by yet another machine-learning model (e.g., a ResNet). For example, a ResNet32-based classifier is used, in which the classifier was pre-trained with another training dataset (e.g., FairFace dataset). Example types of annotations for the pre-processed images can include male and female for gender and White, Black, Asian, Hispanic, Native American and Other Races for race. The ResNet32-based classifier can be trained to achieve average accuracy of 95.7% for gender and 81.5% for race.

The model-training application can thus use the set of training socio-demographic attributes 804 as a ground truth label for the training image 802, so as to facilitate learning of the parameters of the machine-learning model. The annotation process continues for other preprocessed images of the training dataset.

Table 1 shows an example set of annotated images that represent a training dataset:

fied by the user. Loss functions, the generator component, and the discriminator components can be modified as well, as described herein.

The GAN model can include a StyleGAN model. An example structure of StyleGAN is as presented as follows: the latent codes z∈Z are first transformed to intermediate latent space w∈W by a non-linear mapping network f: Z→W. Then the w are transformed to "styles", $v=(v_s, v_b)$, which control the scale and bias in adaptive instance normalization operations after each convolutional layer of the progressive GAN. Namely, the normalization operations include AdaIN $(x,v)=v_s [(x-\mu(x)/\sigma(x)]+v_b$, where x is the feature map. Thus, latent space W essentially controls styles within convolutional layers at each resolution through AdaIN. The StyleGAN can lead to a much less entangled latent space in W compared to input latent space in Z. Alternatively, the GAN model can include StyleGAN2. Compared to StyleGAN, the StyleGAN2 model includes a different generator architecture and introduces a path length regularization into it to better learn the mapping from latent codes to images.

G. Training

As stated above, generating simulated images presents a number of challenges. For example, it is difficult to define what content to visualize when generating simulated images in a particular socio-demographic attributes. For example,

TABLE 1

Data Statistics of SOHQ

| Attributes | Exec. Mangr. | Admin. Asst. | Nurse | Farmer | Military | Security | Track | Cleaner | Carpenter | Plumber | Machine Op. | Tech. Support | Soft. Eng. | Writers |
|---|---|---|---|---|---|---|---|---|---|---|---|---|---|---|
| Male | 447 | 68 | 297 | 659 | 164 | 374 | 488 | 211 | 379 | 582 | 338 | 127 | 199 | 195 |
| Female | 302 | 268 | 959 | 260 | 119 | 72 | 164 | 406 | 113 | 134 | 110 | 251 | 166 | 261 |
| White | 577 | 278 | 735 | 701 | 241 | 413 | 567 | 531 | 444 | 656 | 377 | 328 | 254 | 360 |
| Black | 96 | 12 | 263 | 59 | 26 | 25 | 40 | 50 | 12 | 37 | 25 | 22 | 42 | 41 |
| Asian | 38 | 38 | 163 | 106 | 10 | 6 | 35 | 29 | 17 | 12 | 32 | 17 | 30 | 38 |
| Other | 38 | 8 | 95 | 53 | 6 | 2 | 10 | 7 | 19 | 11 | 14 | 11 | 39 | 17 |
| Total | 749 | 336 | 1256 | 919 | 283 | 446 | 652 | 617 | 492 | 716 | 448 | 378 | 365 | 456 |

The breakdown of images for different attributes are as follows: Male: 4,528, Female: 3,585, White: 6,462, Black: 750, Asian: 571, Other Race: 330. In some instances, a subset of the training dataset is selected. For example, the subset includes 509 images across 13 professions, in which the analyzed socio-demographic attribute includes occupation only.

F. Model Selection

In addition to pre-processing images to generate the training dataset, a machine-learning model can be selected for training. For example, a GAN model is selected. The GAN model is configured to generate new data instances (e.g., images) from training data. The training process of the GAN model includes an unsupervised learning technique for automatically discovering and learning the regularities or patterns in training data, such that the GAN model can output new data instances that plausibly could have been drawn from the original dataset. As stated above, to generate simulated images that enhance socio-demographic diversity, various aspects the GAN model are modified. For example, semi-supervised learning technique can be used for training, in which target socio-demographic attributes (e.g., Asian female CEO) for generating the simulated images are specitraining machine-learning models to generate simulated images can become complex due to different backgrounds, various accessories, multiple people, even among images that share similar socio-demographic attributes. Thus, experimental results show that conventional GAN models fail to generate faces for all combinations of socio-demographic attributes (e.g., gender, age) across different occupations, because of the class imbalance that exists in the training dataset.

In another example, conventional metrics to evaluate the quality of the simulated images may not be effective. In particular, Frechet Inception Distance (FID) is not ideal for enhancing socio-demographic diversity, as it cannot quantify the image quality of the simulated images in terms of facial attributes.

The following training techniques can address the above challenges. First, to explicitly control the simulated image generation process, class-conditioning is introduced during training of the machine-learning model (e.g., StyleGAN2). Further, to overcome the bias in the training dataset, two training configurations are used: (i) weighted loss; and (ii) over-sampling the minority class. Second, as there is no existing dataset to train such models for de-biasing image search results, specific pre-processing of raw images is used to build a high-quality training dataset. Third, a metric called Attribute Matching Score (AMS) is used to evaluate the quality of the simulated images in terms of socio-demographic attributes.

1. Pre-Training

Figure 9:
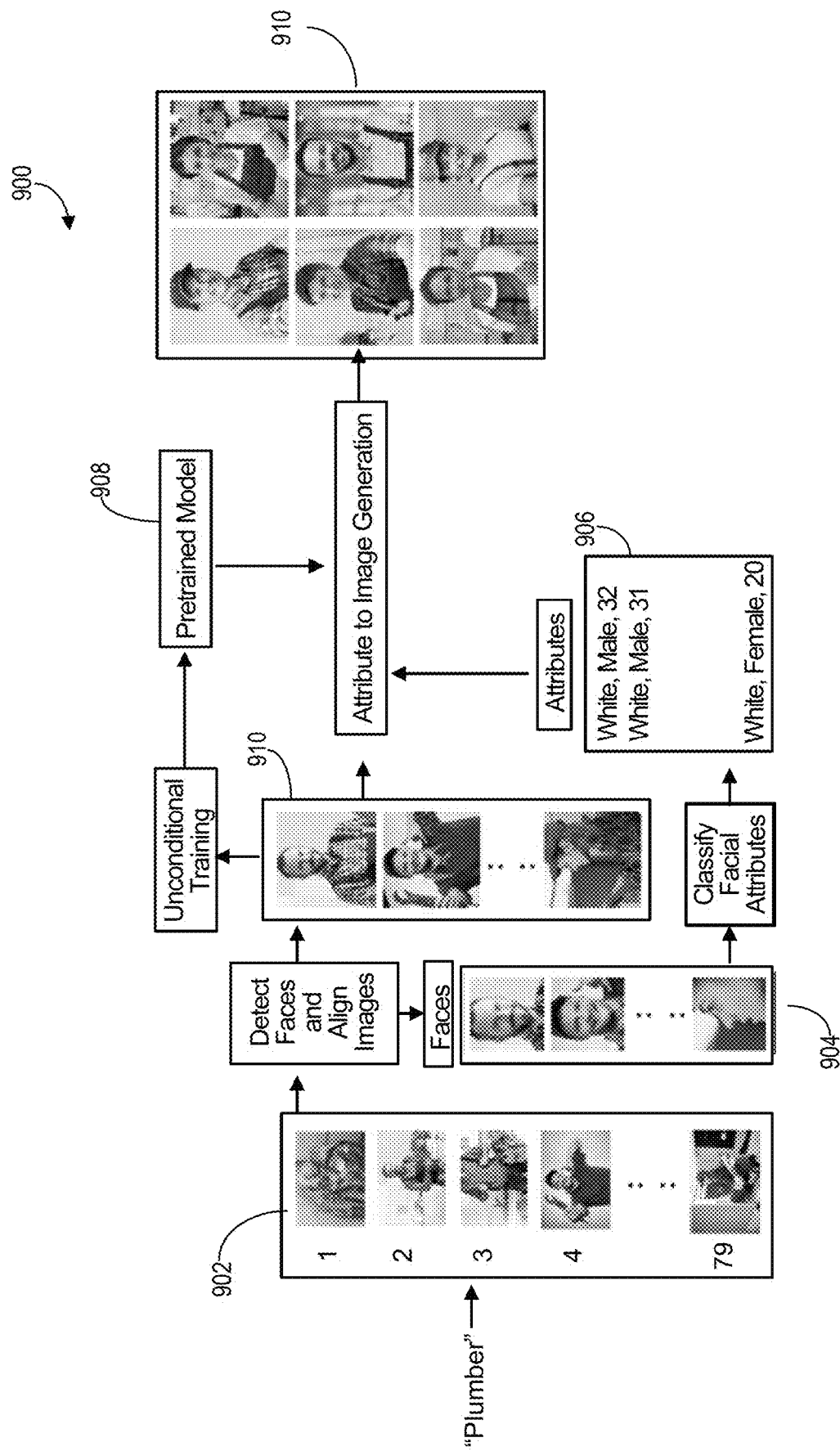
FIG. 9 shows a schematic diagram for pre-training a machine-learning model to generate simulated images that enhance socio-demographic diversity, according to some embodiments.

FIG. 9 shows a schematic diagram 900 for pre-training a machine-learning model to generate simulated images that enhance socio-demographic diversity, according to some embodiments. A model-training application (e.g., the model-training application 116 of FIG. 1) can manage, coordinate, or otherwise involved in a pre-training phase of the machine-learning model. Initially, the model-training application receives a set of training images 902. Each training image of the set of training images 902 depicts a plumber. As shown in FIG. 9, the set of training images 902 appear to be biased towards a particular socio-demographic group (e.g., young white male). The set of training images 902 includes a training image "79" depicting a female plumber, but no more. Thus, the set of training images 902 show a class imbalance. To address this class imbalance, the model-training application performs oversampling of the training dataset by generating duplicate copies of the training image "79." In addition, the model-training application performs augmentation by generating different variations of the training image "79." For example, an augmented training image is generated by modifying color, orientation, contrast, brightness, and/or position of the female plumber depicted in the training image "79."

The model-training application performs pre-processing of the set of training images 902. For example, the model-training application generates a set of training-image regions 904, in which each training-image region depicts a face of the respective subject. In some instances, the face detection is performed by applying another machine-learning model (e.g., a convolutional neural network) to each training image of the set of training images 902. Each training-image region of the set of training-image regions 904 facilitates annotation of a corresponding training image of the set of training images 902. The annotations include sets of training socio-demographic attributes 906, in which each set of training socio-demographic attributes define visual characteristics (e.g., race, gender, age, occupation) associated with a corresponding training image. In some instances, annotations are performed manually (e.g., by a user). Additionally or alternatively, the annotations for generating the sets of training socio-demographic attributes 906 are performed by yet another machine-learning model (e.g., a residual neural network). The model-training application can thus use the sets of training socio-demographic attributes 906 as ground truth labels for the respective training images of the set of training images 902, so as to facilitate learning of the parameters of the machine-learning model.

In addition to generating the sets of training socio-demographic attributes 906, the model-training application uses the set of training images 902 to pre-train the machine-learning model, thereby generating a pre-trained machine-learning model 908. The pre-training includes an unconditional training of the machine-learning model, in which each of the components (e.g., a generator component, a discriminator component) is trained without any modifications to loss functions or oversampling of the training dataset (e.g., the set of training images 902). The pre-training allows the pre-trained machine-learning model 908 to be further trained generate a simulated image that realistically depicts anatomical features of a corresponding subject.

The pre-trained machine-learning model 908 is further trained to predict socio-demographic attributes for the simulated images. In some instances, the weights of the pre-trained machine-learning model 908 are transferred to another machine-learning model that can be specifically trained to generate the simulated images. For example, the trained machine-learning model generates a set of predicted socio-demographic attribute for each of the set of training images 902. The trained machine-learning model is then configured to learn its parameters based on a comparison between the set of predicted socio-demographic attributes and a corresponding set of socio-demographic attribute of the sets of training socio-demographic attributes 906. In some instances, a discriminator component of the trained machine-learning model generates a first logit value representing the set of predicted socio-demographic attributes and a second logit value representing the set of training socio-demographic attributes. Then, the discriminator determines a loss (e.g., a classification loss) between the two logit values. The loss is then used for learning of the parameters of the trained machine-learning model. As a result, the trained machine-learning model is trained to: (1) generate a simulated image that realistically depicts anatomical features of a corresponding subject; and (2) accurately predict a set of socio-demographic attributes for the simulated image. For example, a set of simulated images 910 generated by the trained machine-learning model are shown. The trained machine-learning model is then additionally trained using different training configurations to generate simulated images that enhance socio-demographic diversity.

Figure 10:
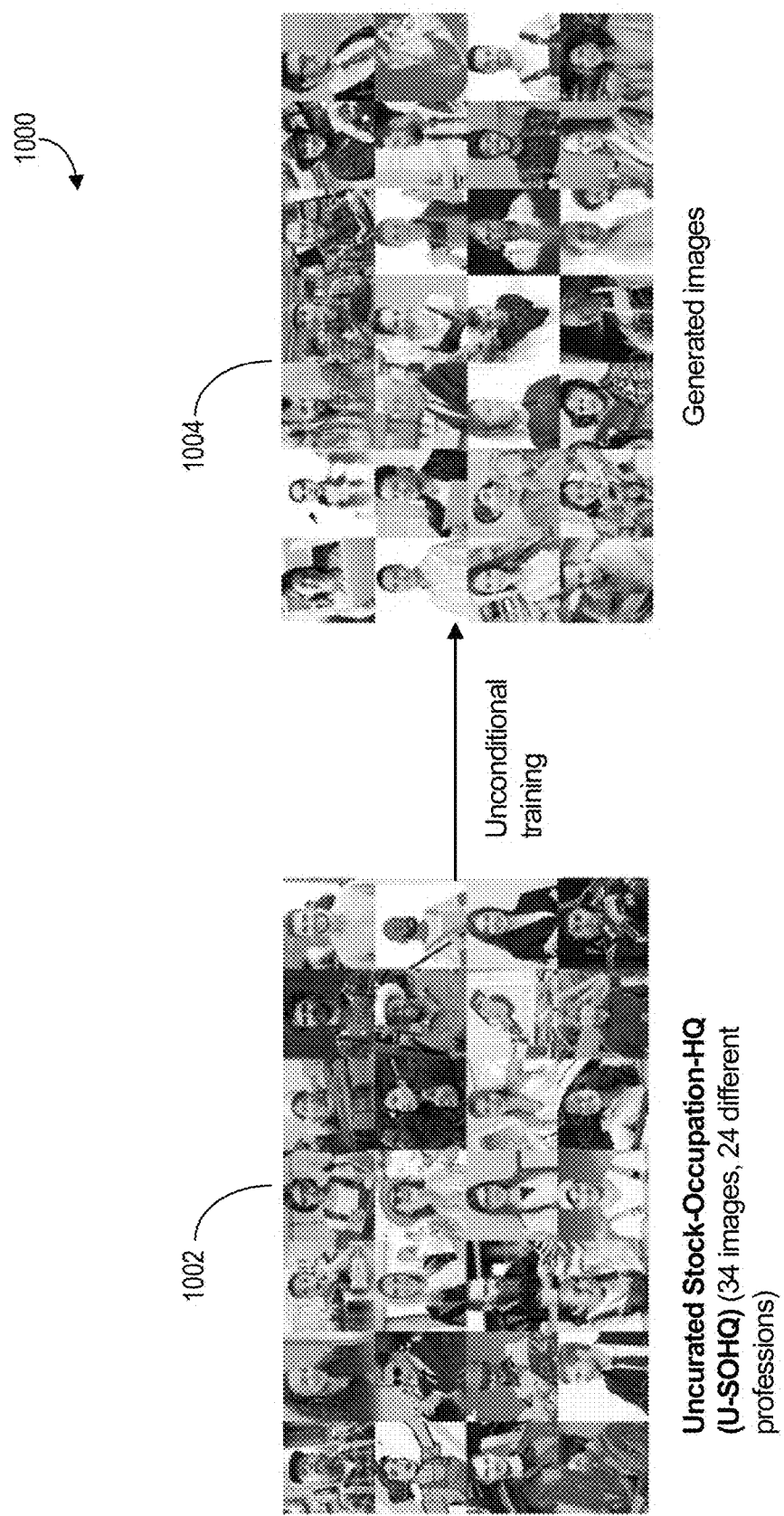
FIG. 10 shows an example set of simulated images generated by a machine-learning model pre-trained with a pre-training dataset, according to some embodiments.

FIG. 10 shows an example set of simulated images 1000 generated by a machine-learning model pre-trained with a pre-training dataset, according to some embodiments. In this current example, the unconditional training of the pre-trained model is based on an uncurated set of training images 1002. The uncurated set of training images 1002 refer to training images that are not selected based on a particular criteria (e.g., plumber). This allows the pre-training machine-learning model to generate simulated images across various criteria and accurately predict a set of socio-demographic attributes for each of the simulated images.

2. Training

Figure 11:
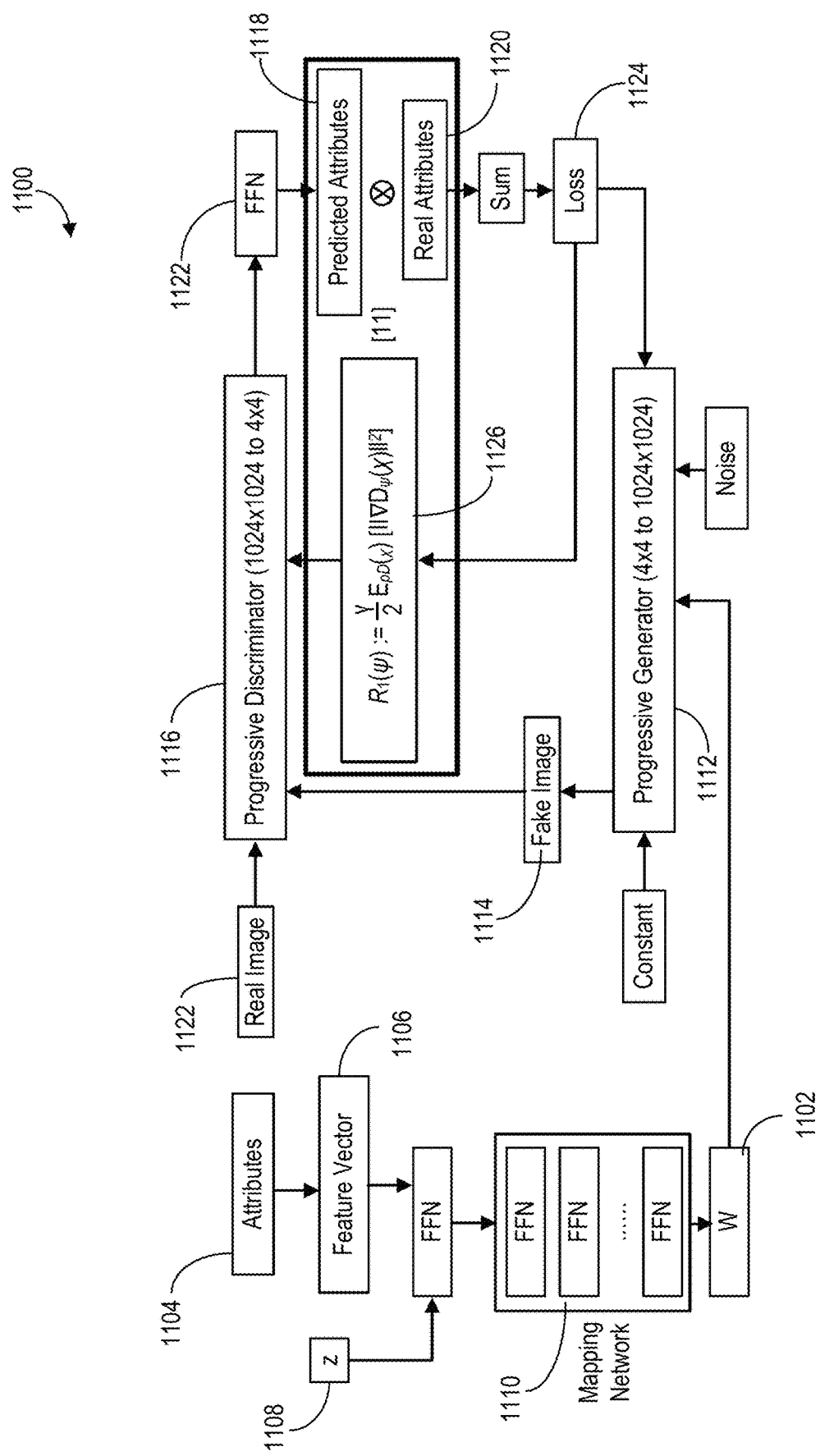
FIG. 11 shows a schematic diagram of training a machine-learning model for generating simulated images that enhance socio-demographic diversity, according to some embodiments.

FIG. 11 shows a schematic diagram 1100 of training a machine-learning model for generating simulated images that enhance socio-demographic diversity, according to some embodiments. In some embodiments, the machine-learning model is a pre-trained machine-learning model 908 of FIG. 9. In some embodiments, the machine-learning model is a different machine-learning model, to which pre-trained weights of the pre-trained machine-learning model 908 are applied.

a) Initial Configuration of the Machine-Learning Model

The training process 1100 includes generates a set of embeddings 1102 based on the sets of training socio-demographic attributes 1104. Each embedding of the set of embeddings 1102 is generated from a feature vector 1106 that represents a corresponding set of training socio-demographic attributes of the training dataset. In some instances, the feature vector 1106 is processed with one or more latent codes 1108 to generate the embedding. The latent codes are used to add variability to the simulated images, so as to avoid all simulated images to appear the same when they are generated to match the target set of attributes. Additionally or alternatively, one or more additional machine-learning models (e.g., a set of feed-forward neural networks 1110) are applied to generate the set of embeddings 312.

For example, one-hot encode is performed on each type of socio-demographic attribute (occupation, gender, and race). These one-hot encodings are concatenated to generate a single vector y (e.g., the feature vector 1106). That is: $y=[y_{occupation}|y_{gender}|y_{racd}]$. Then, a feedforward network 1102 is used to embed these features along with latent codes z (e.g., the latent codes 1108).

The embedding 1102 is then fed into a generator 1112 of StyleGAN2, $G_\theta$. A candidate simulated image 1114 (e.g., "fake image") is outputted by the generator 1112. Then, the candidate simulated image 1114 is inputted to a discriminator $D_\emptyset$ 1116, such that the discriminator 1116 determines whether the candidate simulated image 1114 accurately depicts a real-life subject. In addition, the discriminator 1116 further determines whether the set of predicted socio-demographic attributes 1118 substantially match the set of training socio-demographic attributes 1120 (e.g., the set of training socio-demographic attributes 1104). The set of predicted socio-demographic attributes 1118 are generated by applying another machine-learning model (e.g., a feed-forward neural network 1122) to an output generated by the discriminator 1116.

The discriminator 1116 calculates a first loss between the candidate simulated image 1114 and a corresponding training image 1122, in which the first loss identifies a difference between visual characteristics of the candidate simulated image 1114 and the corresponding training image 1122. The logit values are generated by applying a logit function to an output generated by the discriminator 1116.

In addition to the first loss, the discriminator 1116 calculates a second loss between the candidate simulated image 1114 and the corresponding training image 1122, in which the second loss identifies a difference between the set of predicted socio-demographic attributes 1118 of the candidate simulated image 1114 and the set of training socio-demographic attributes 1120 of the corresponding training image 1122. A total loss 1124 is derived from the calculated first and second losses. The total loss 1124 is then used to modify parameters of the generator 1112 and the discriminator 1116, such that the parameters are learned to minimize the total loss 1124. The loss minimization can be performed by applying the total loss 1124 to a gradient descent algorithm (for example). The training of the generator 1112 and the discriminator 1116 is determined to be successful if the total loss 1124 decreases to become a value that is under a particular threshold. In some instances, training of the generator 1112 is "frozen," such that the total loss 1124 is only applied for learning of the parameters of the discriminator 1116. Alternatively, training of the discriminator 1116 is "frozen," such that the total loss 1124 is only applied for learning of the parameters of the generator 1112.

In some instances, a regularizer R 1126 is used on the gradient of the discriminator 1116 to stabilize the high-quality conditional image generation process. Specifically, if $D_\emptyset(x|y)$ is the discriminator score for an image x with condition y, then the R regularizer is as follows:

$$R(\emptyset) = \frac{\gamma}{2}\|D_\emptyset(x|y)\|^2.$$

Here, $\gamma$ is a hyperparameter to control the regularization process.

To calculate the score from the discriminator 1116, a separate real/fake discriminator for each class is obtained and a separate logit for each of them is predicted. These discriminators share layers except the last layer, $f_\emptyset(x)$, which outputs a score for each class (thus, $f_\emptyset(x)$ has the same dimension as y). Then, an element-wise multiplication is performed with the attribute vector to select the corresponding index for calculating the logit in the loss function. That is:

$$D_\emptyset(x|y)=\Sigma f_\emptyset(x)*y \tag{1}$$

In some instances, the following non-saturating loss is used which is employed for high-quality face generation based on the training dataset (e.g., FFHQ):

$$L(\theta,\emptyset)=E_{p(z)}[f(D_\emptyset(G_\theta(z|y)))]+E_{p(D(x))}[f(x|y))], \tag{2}$$

where x is the input image, y is the attribute vector, and f is the soft-plus activation function. This finalizes the design of architecture of the machine-learning model.

b) Weighting Configuration

To improve from the above architecture, configurations of the model and/or the training procedure are modified to address the bias in the training dataset to generate more simulated images corresponding to the set of target socio-demographic attributes. For example, a modified loss function such as cost-sensitive losses is used, in which where scores for different classes are weighted to handle the imbalance of classes in the training dataset in classification tasks. To modify the loss function, the following changes to the logit function are applied:

$$D_\emptyset(x|y)=\Sigma f_\emptyset(x)*(m*y), \tag{3}$$

where m is the weight vector and has the same dimension as y. If a class needs weighting, its corresponding index in m is set to an appropriate weight. Otherwise, it is set to 1. The weighting of the logit values produces an output that is then used by the loss function to determine the loss.

c) Oversampling

Further, although the distribution of different attributes in the dataset is not uniform, oversampling from the dataset can be performed to create a uniform distribution during training and thereby reduce bias in the training dataset. In some instances, the oversampling includes generating duplicated copies of training images that corresponding to the set of target socio-demographic attributes. This will lead to better mapping of combinations of non-stereotypical attributes. However, oversampling alone may lead to an overfitting issue, as the same images from rare classes will appear more times and can destabilize the training. For example, the FID score drops initially. After a certain stage, however, the FID score starts to increase continuously, and training begins to diverge.

Figure 12:
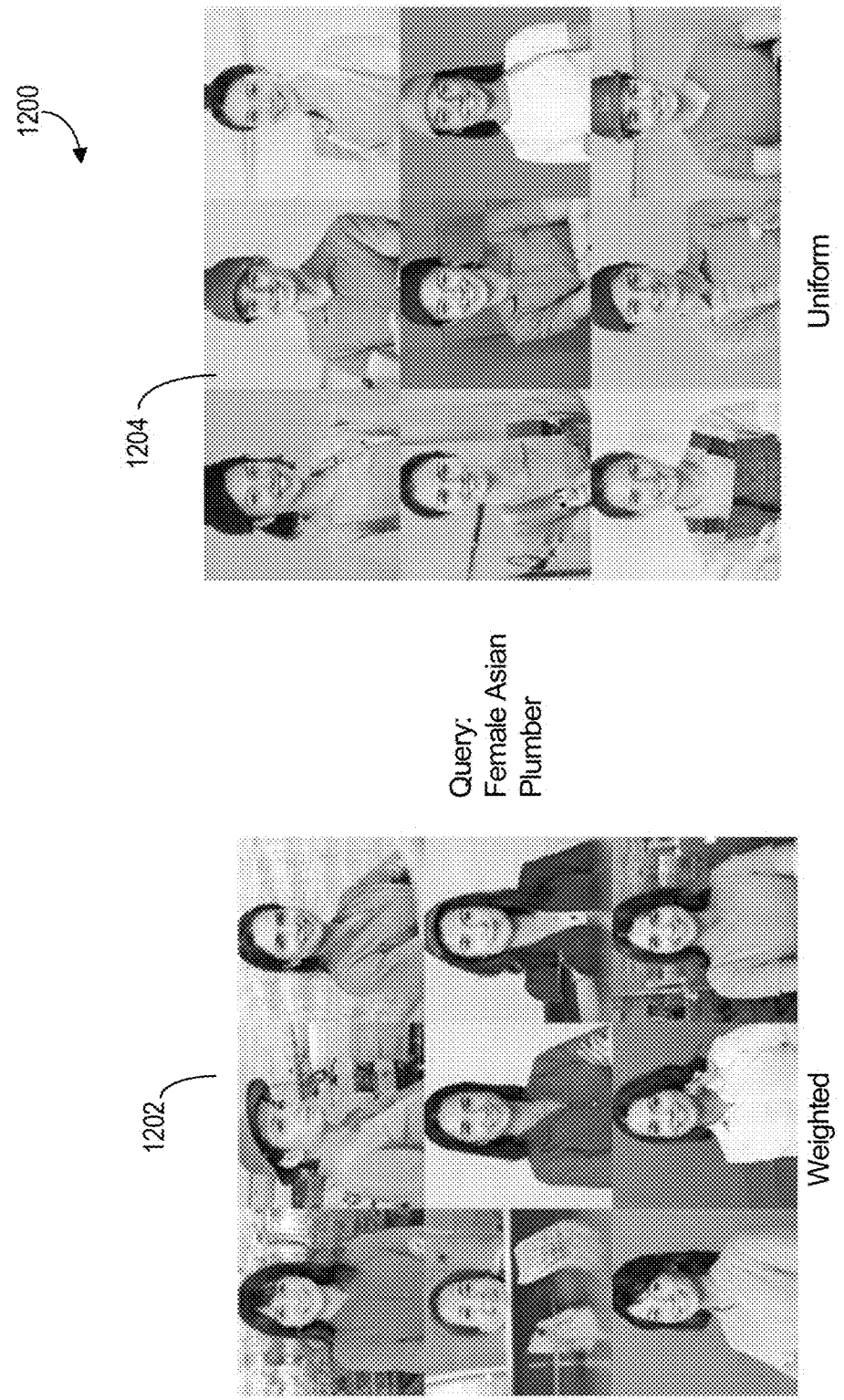
FIG. 12 shows a comparison between a first set of simulated images in which weighting was applied during a training phase and a second set of simulated images in which weighting and oversampling were applied during another training phase.

FIG. 12 shows a comparison 1200 between a first set of simulated images 1202 in which weighting was applied and a second set of simulated images 1204 in which weighting and oversampling were applied during a training phase. As shown in FIG. 12, the second set of simulated images 1204 depict the subjects with the set of target socio-demographic attributes (e.g., a female Asian plumber) more accurately, relative to the first set of simulated images 1202.

d) Augmentation

Figure 13:
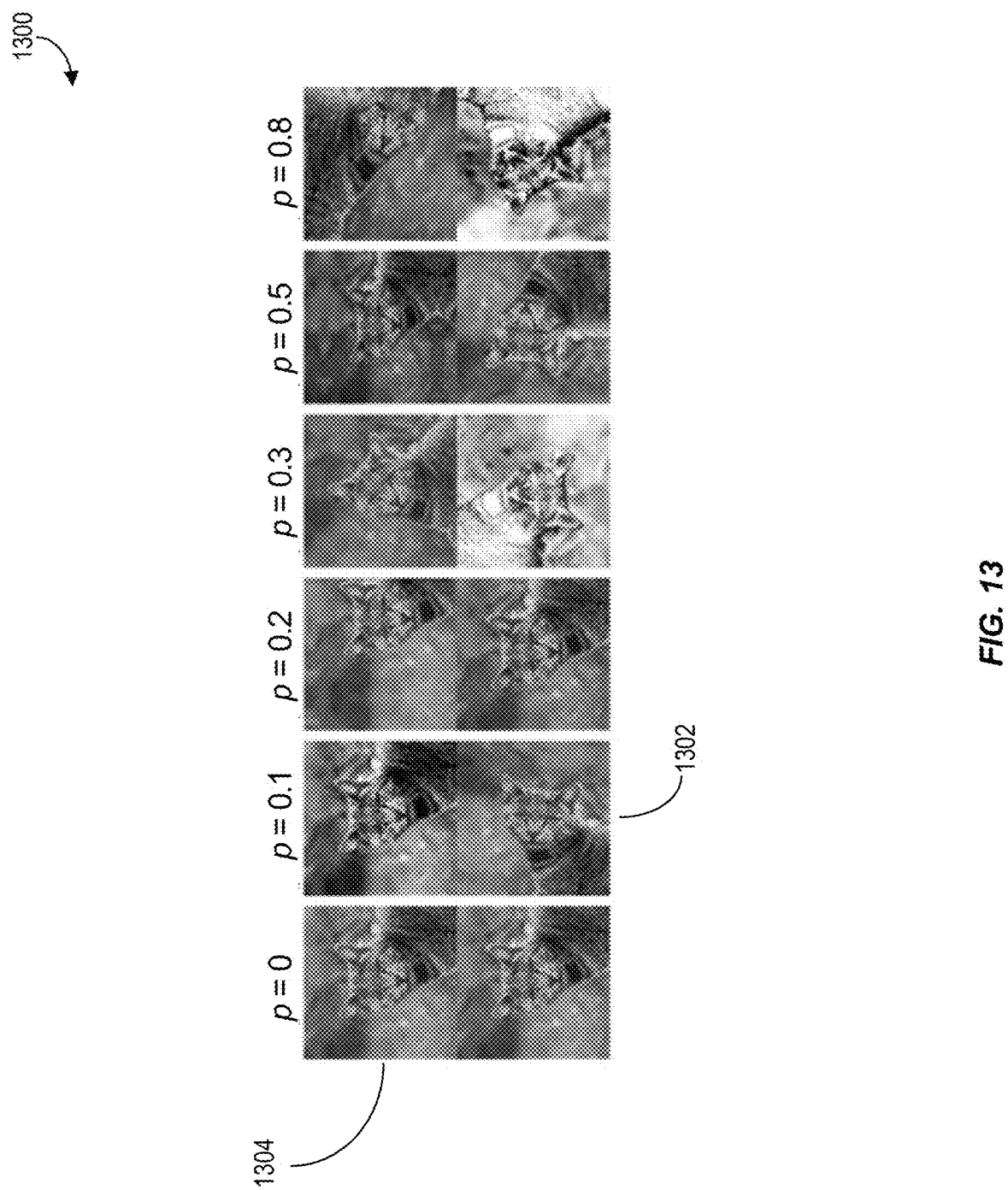
FIG. 13 shows an example set of augmented training images, according to some embodiments.

To reduce the overfitting issues caused by overfitting, augmentation can be applied to the training images. FIG. 13 shows an example set of augmented training images 1300, according to some embodiments. In the example set of augmented training images, each training image can be augmented by modifying its orientation, pixel resolution, color, orientation, shape, position, contrast, and brightness. For example, an augmented image 1302 shows a subject of a training image 1304 that is rotated clockwise by 90 degrees.

In some instances, Adaptive Discriminator Augmentation (ADA) applies a wide range of augmentations to the duplicated training images with a probability p<1 to prevent the discriminator from overfitting. As long as the probability of a particular augmentation transformation is less than 1, the discriminator is still able to recover the original distribution. Given ADA's effectiveness to prevent overfitting, experiments show promising results of using a machine-learning model that utilizes weighting, oversampling, and augmentation.

e) Output

Figure 14:
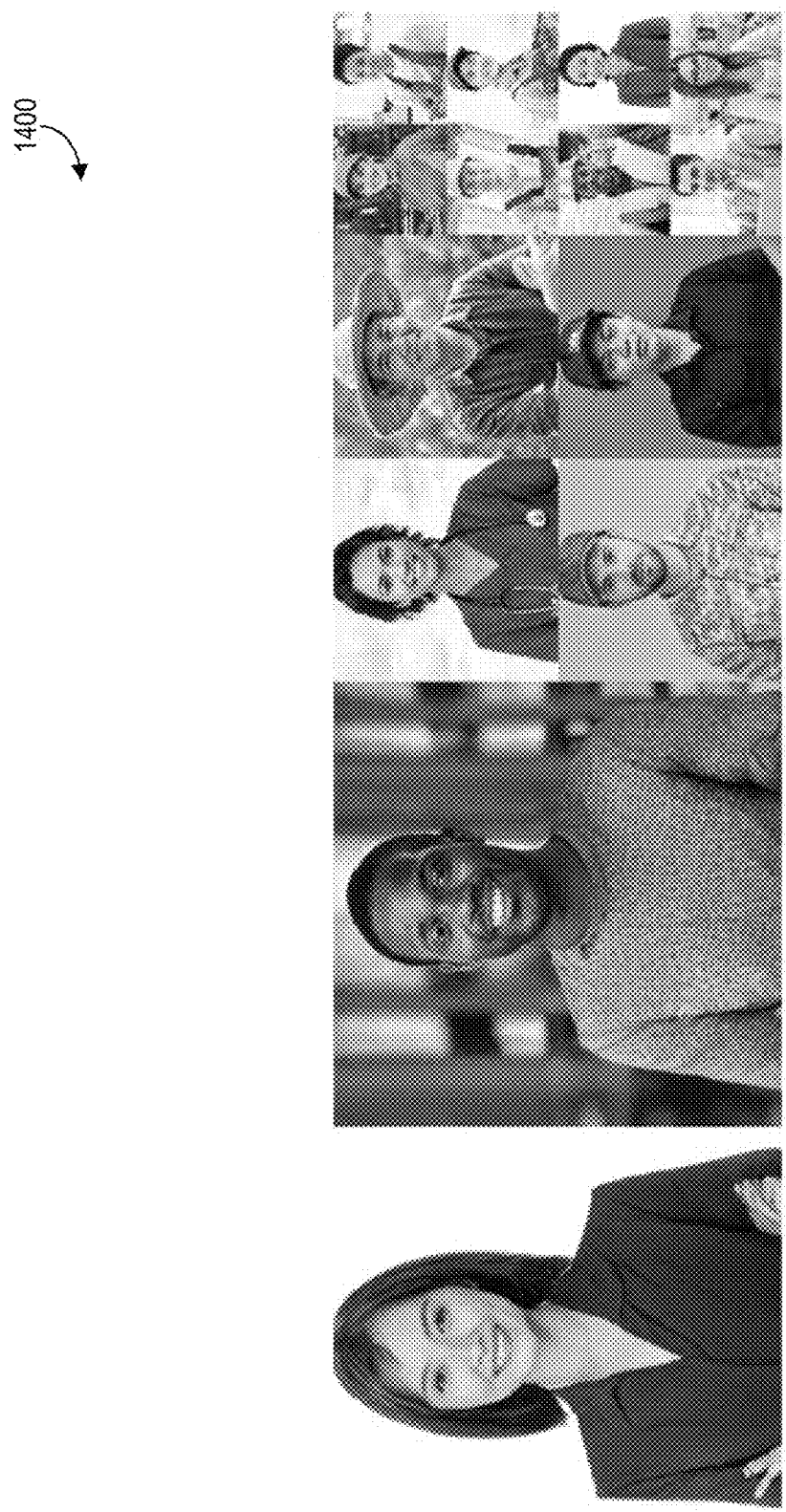
FIG. 14 shows an example set of simulated images generated by the machine-learning model trained with weighting, oversampling, and augmentation, according to some embodiments.
Figure 15:
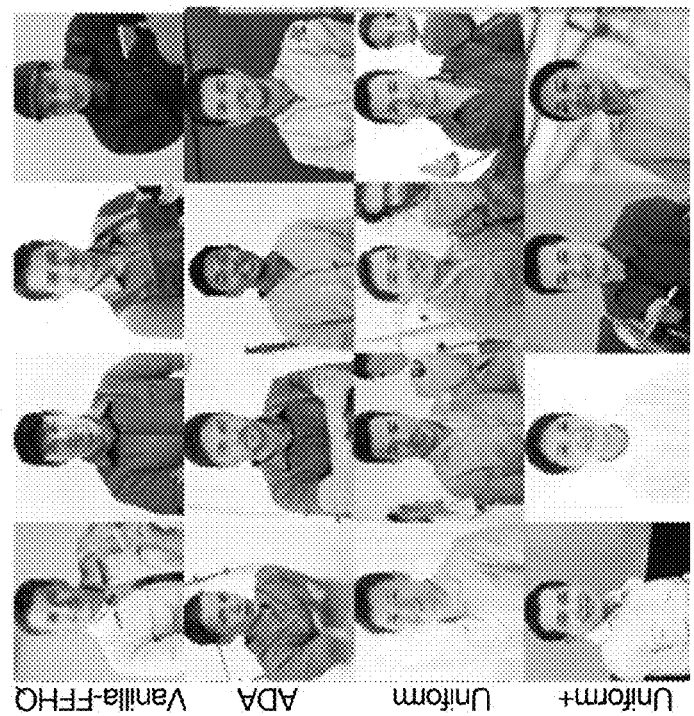
FIG. 15 shows an example set of simulated images generated for evaluation of various machine-learning models.
Figure 15:

Finally, the machine-learning model trained using the above three configurations can generate accurate simulated images that enhance socio-demographic diversity. FIG. 14 shows an example set of simulated images 1500 generated by the machine-learning model trained with weighting, oversampling, and augmentation, according to some embodiments. In FIG. 14, curated collection of generated simulated images are presented as follows (from left to right, top to bottom): "executive manager", "administrative assistant", "nurse", "farmer", "military person", "security guard", "truck driver", "cleaner", "carpenter", "plumber", "machine operator", "technical support person", "software engineer", "writer." As shown in FIG. 15, the simulated images can provide an accurate depiction of subjects in non-stereotypical occupations. Incorporating these simulated images to existing images can substantially increase socio-demographic diversity in multimedia content.

H. Experimental Results

Various types of machine-learning models are trained to generate simulated images associated with the set of target socio-demographic attributes. Performance of each of six types of machine-learning models are evaluated (e.g., Van-FFHQ, Vanilla, Weighted, ADA, Uniform, Uniform+). As the experiments show, the machine-learning model trained with weighting, oversampling, and augmentation (Uniform+ model) perform better than other machine-learning models.

1. Methods

Machine-learning models are built in Tensor-Flow and the corresponding official codebases of Style-GAN2 and Style-GAN2-ADA are used for base models. As there are 14 professions, 2 genders, and 4 races, the attribute vector includes 20 dimensions (20-D). For pre-training, two different datasets are used. First, StyleGAN2 model is trained using Flickr-Faces-HQ Dataset (FFHQ) dataset until convergence. The StyleGAN2's pre-trained weights are applied to a "Vanilla" model. The Vanilla model refers to a machine-learning model having an architecture 1100 of FIG. 11, but does not include additional configurations such as weighting, oversampling, or augmentation. The Vanilla model trained with FFHQ dataset is referred to as "Van-FFHQ" model, which was evaluated in this experiment.

In several implementations, FFHQ dataset may not provide sufficient data for training the machine-learning model, because faces alone may not identify certain socio-demographic attributes (e.g., an occupation). Thus, a training dataset should include images that depict not only faces but also various accessories, instruments, attires, and/or backgrounds across different professions. Therefore, for pretraining purposes, a large number of images (around 34 thousand) are collected for 23 different professions and they are automatically processed (using the face detection and alignment pipeline). The processed dataset is called Uncurated Stock-Occupation HQ (U-SOHQ). StyleGAN2 was trained unconditionally on this dataset until convergence. The pre-trained weights of the StyleGAN2 were applied to all models except for Vanilla-FFHQ model. For example, a "Vanilla" model applied with pre-trained weights learned from the U-SOHQ dataset was evaluated.

In addition, a truncation technique is used, where the center of mass in the latent codes w is first calculated, and then samples are chosen randomly within a deviation φ (called the truncation value) from this center. Mathematically representation of the truncation technique is $w' = \bar{w} + \varphi(w - \bar{w})$, where $\bar{w}$ is the center and the w's are the latent codes. Good results are observed when φ=0.7 is set.

To further evaluate the performance of the machine-learning models, weighting configuration was applied to the machine-learning models. For example, a weight of 2 is set for the 'Female' class, and 4 for the 'Black' and 'Asian' classes, based on their frequency. A "Weighted" model applied with pre-trained weights learned from the U-SOHQ dataset was evaluated, in which the Weighted model corresponds to the architecture of the Vanilla model modified, but with the weighting configurations only.

Oversampling was applied to training images of the U-SOHQ dataset. A "Uniform" model was evaluated, in which the Uniform model corresponds to the Weighted model applied with pre-trained weights learned from the oversampled U-SOHQ dataset.

To continue the evaluation, augmentation was also applied to training images of the oversampled U-SOHQ dataset. Thus, a "Uniform+" model was evaluated, in which the Uniform+ model corresponds to the Weighted model applied with pre-trained weights learned from the augmented and oversampled U-SOHQ dataset. For further comparison, an "ADA" model was also evaluated, in which the ADA model corresponds to an existing StyleGAN2-ADA model applied with pre-trained weights learned from the augmented U-SOHQ dataset. For ADA and the Uniform+ models, the probability of augmentation is set to 0.7. Finally, γ is set to 10 in the R regularizer for all models.

2. Evaluation Metrics

The FID score was used to quantify the quality of the generated images. FID measures the maximum distance between Gaussians fitted to the distributions of real and fake images. To measure how well generated faces align with the given attributes, another metric named Attribute Matching Score (AMS) was used. The AMS identifies the percentage of the time the given attributes match with the predicted ones. To predict the attributes from the generated images, 100 images are generated for all 112 combinations of race, gender, and occupation (11,200 images in total). Then, using trained attribute classifiers, the AMS for each attribute is computed. For detecting profession, a ResNet56 classifier is trained on the dataset, which achieves 80.28% top-accuracy and 94.57% for top-3. Top-3 accuracy is used because some professes have similar types of attire (for example, both an 'administrative assistant' and an 'executive manager' usually dress in business casual). A good model should result in a low FID score and a high AMS.

3. Quantitative Results

Table 2 shows the quantitative results of all the models for all metrics. Under AMS, the matching scores for individual attributes (G=R=O) and the average of all three are shown.

TABLE 2

Experimental results.
All models were pre-trained with U-SOHQ except Vanilla-FFHQ. The results show that Uniform+ achieves the best tradeoff between FID and AMS.

| Model | FID↓ | AMS (%)↑ | | | | |
| --- | --- | --- | --- | --- | --- | --- |
| | | G | R | O | Avg. | All 3 |
| Van-FFHQ | 21.11 | 86.81 | 38.66 | 63.66 | 63.04 | 23.71 |
| Vanilla | 14.89 | 86.00 | 34.72 | 60.14 | 60.29 | 20.34 |
| ADA | 13.89 | 80.78 | 34.76 | 67.79 | 61.11 | 19.99 |
| Weighted | 15.59 | 85.25 | 41.55 | 62.70 | 63.17 | 23.57 |
| Uniform | 22.75 | 85.30 | 43.77 | 69.20 | 66.09 | 27.21 |
| Uniform+ | 17.34 | 83.33 | 51.81 | 63.48 | 66.21 | 27.50 |

Van-FFHQ: Vanilla-FFHQ,
G: Gender,
R: Race,
O: Occupation,

On average, Uniform+ achieves the best results, although its FID is relatively high. "Comb." (short for combined) refers to the stricter criterion that all three attributes are correct simultaneously, and Uniform+ again has the best score. The FID score improves significantly between the Vanilla models when pre-trained weights from U-SOHQ datasets instead of FFHQ dataset were used. However, using the pre-trained weights from U-SOQH datasets results in lower AMS, as shown in the Vanilla model. Similar results are observed from ADA model. While it achieves the lowest FID score, the combined AMS for Vanilla model and the ADA model are the worst among all models.

This phenomenon can be explained as follows: assume that one model faces "mode collapse" and thus outputs one image for each set of socio-demographic attributes. In this case, it is easy to generate an image that is faithful to the given attributes, so the AMS score will be high, but due to low variance in the images, the FID score will be high. This is demonstrated in the Uniform model, which indicates low variance in image and potential overfitting. Thus, there is a tradeoff where a model has to achieve as a low FID score while keeping a high AMS.

The Weighted model comes close to achieving this goal. Its FID is lower while the attribute matching scores are higher. The Uniform model show similar improvements on the FID scores and AMS. Unfortunately, the Uniform model has training divergence issues due to the repetition of the same images. That is, after reaching a minimum FID score, the FID score starts increasing again as training is continued. The lowest achievable FID score for Uniform is 22.75, which is the worst across all of the evaluated machine-learning models.

By contrast, the Uniform+ model produces the highest combined AMS while keeping the FID score much lower than the Uniform model. Further, the training logs did not suggest any indication of divergence or "mode collapse" for the Uniform+ model. Although its individual scores for gender and occupation were lower than Uniform, the following qualitative analysis shows that the performance gap is mainly due to similar images generated by the Uniform model and the plain background generated by Uniform+.

4. Qualitative Results

For qualitative analysis, the best performing machine-learning models under each metric are used, namely the Van-FFHQ, ADA, Uniform, and Uniform+ models. Their generalization performance is evaluated by using the example queries from the introduction: "female Black machine operator"; and "male Asian administrative assistant." In the dataset, there was no image of a female Black machine operator, and just one image of a male Asian administrative assistant. Accordingly, the objective of this experiment was a strong challenge for the models.

FIG. 15 shows an example set of simulated images 1600 generated for evaluation of various machine-learning models. The simulated images 1600 showed that all machine-learning models struggled with the above queries, and no single machine-learning model all accurate results. As expected, almost complete absence of relevant images has rendered the task to be challenging across all models, but the evaluation was helpful to assess performance of these machine-learning models when training dataset does not include any images that match the target socio-demographic attributes.

As shown in FIG. 15, the Van-FFHQ model showed relatively low variability, especially in the female faces, as reflected in its FID score. It is able to generate correct "female" and "male" faces, reflecting its relatively high gender AMS. However, the generated faces (especially the males) are not correct for race attributes, and the clothes do not appear to fit the intended occupation. The ADA model, on the other hand, shows a lot of variability in the simulated images, but is error-prone across all three socio-demographic attributes (e.g., age, gender, race). The Uniform model is able to generate racially correct faces for both queries in most cases, but does not generalize well to the unseen query 'female Black machine operator' as it produced mostly male faces. On the other hand, the Uniform+ model generates images that generally correspond to the given socio-demographic attributes, resulting in the highest combined AMS. The Uniform+ model also shows some variance between the simulated images.

5. Variability in Simulated Images

Figure 16:
FIG. 16 shows a comparison between: (i) a first set of simulated images in which weighting and oversampling were applied during a training phase; and (ii) a second set of simulated images in which weighting, oversampling, and data augmentation were applied during another training phase.

As mentioned above, a model can perform better under AMS, if the model generates simulated images that appear similar to each other. FIG. 16 shows a comparison between: (i) a first set of simulated images 1602 in which weighting and oversampling were applied during a training phase; and (ii) a second set of simulated images 1604 in which weighting, oversampling, and data augmentation were applied. The query included target socio-demographic attributes corresponding to "white male machine operator." As shown in FIG. 16, the second set of simulated images 1604 produce a more diverse set of simulated images that accurately depict the subjects, whereas the first set of simulated images 1602 tend to be limited to a particular visual characteristics across all images (e.g., a hard hat).

The simulated images from the Uniform model 1602 consistently include artifacts and similar image features (e.g., similar faces with yellow hats in similar orientations). This is due to the duplication of training images in the training dataset for oversampling. The lack of variance also shows early signs of 'mode collapse.' Although images are similar, the socio-demographic attributes in the simulated images 1602 are generally correct, thus it has sacrificed diversity in the service of attribute accuracy.

By contrast, the Uniform+ model was trained with more diverse images (due to augmentation). As a result, the simulated images 1604 do not include artifacts or repetitions in them. This explains the performance gap seen between the Uniform and Uniform+ models. Finally, while the Uniform+ model produces a limited background image regions, it successfully captures the dress styles of different jobs.

I. Example of a Computing Environment

Figure 17:
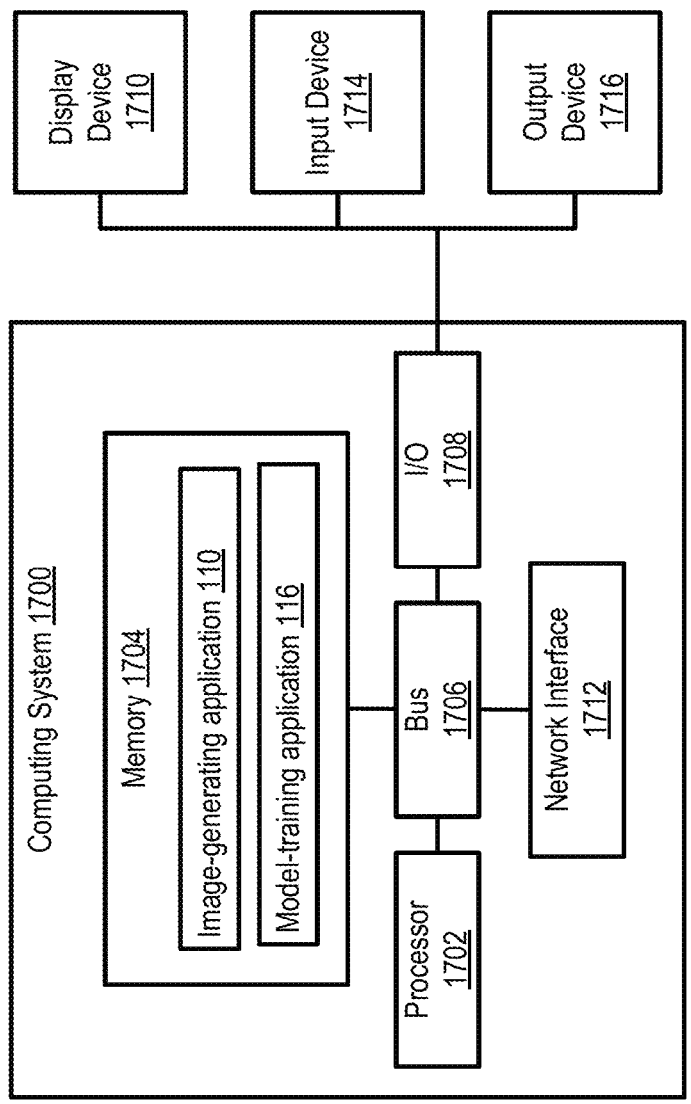
FIG. 17 depicts a computing system for generating simulated images that enhance socio-demographic diversity, according to some embodiments.

Any suitable computing system or group of computing systems can be used for performing the operations described herein. For example, FIG. 17 depicts a computing system 1700 that can implement any of the computing systems or environments discussed above. In some embodiments, the computing system 1700 includes a processing device 1702 that executes the image-generating application 110 and/or model-training application 116, a memory that stores various data computed or used by the image-generating application 110 and/or model-training application 116, an input device 1714 (e.g., a mouse, a stylus, a touchpad, a touchscreen, etc.), and an output device 1716 that presents output to a user (e.g., a display device that displays graphical content generated by the image-generating application 110 and/or model-training application 116). For illustrative purposes, FIG. 17 depicts a single computing system on which the image-generating application 110 and/or model-training application 116 is executed, and the input device 1714 and output device 1716 are present. But these applications, datasets, and devices can be stored or included across different computing systems having devices similar to the devices depicted in FIG. 17.

The example of FIG. 17 includes a processing device 1702 communicatively coupled to one or more memory devices 1704. The processing device 1702 executes computer-executable program code stored in a memory device 1704, accesses information stored in the memory device 1704, or both. Examples of the processing device 1702 include a microprocessor, an application-specific integrated circuit ("ASIC"), a field-programmable gate array ("FPGA"), or any other suitable processing device. The processing device 1702 can include any number of processing devices, including a single processing device.

The memory device 1704 includes any suitable non-transitory, computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1700 may also include a number of external or internal devices, such as a display device 1710, or other input or output devices. For example, the computing system 1700 is shown with one or more input/output ("I/O") interfaces 1708. An I/O interface 1708 can receive input from input devices or provide output to output devices. One or more buses 1706 are also included in the computing system 1700. Each bus 1706 communicatively couples one or more components of the computing system 1700 to each other or to an external component.

The computing system 1700 executes program code that configures the processing device 1702 to perform one or more of the operations described herein. The program code includes, for example, code implementing the image-generating application 110 and/or model-training application 116 or other suitable applications that perform one or more operations described herein. The program code may be resident in the memory device 1704 or any suitable computer-readable medium and may be executed by the processing device 1702 or any other suitable processor. In some embodiments, all modules in the image-generating application 110 and/or model-training application 116 are stored in the memory device 1704, as depicted in FIG. 17. In additional or alternative embodiments, one or more of these modules from the image-generating application 110 and/or model-training application 116 are stored in different memory devices of different computing systems.

In some embodiments, the computing system 1700 also includes a network interface device 1712. The network interface device 1712 includes any device or group of devices suitable for establishing a wired or wireless data connection to one or more data networks. Non-limiting examples of the network interface device 1712 include an Ethernet network adapter, a modem, and/or the like. The computing system 1700 is able to communicate with one or more other computing devices (e.g., a computing device that receives inputs for image-generating application 110 and/or model-training application 116 or displays outputs of the image-generating application 110 and/or model-training application 116) via a data network using the network interface device 1712.

An input device 1714 can include any device or group of devices suitable for receiving visual, auditory, or other suitable input that controls or affects the operations of the processing device 1702. Non-limiting examples of the input device 1714 include a touchscreen, stylus, a mouse, a keyboard, a microphone, a separate mobile computing device, etc. An output device 1716 can include any device or group of devices suitable for providing visual, auditory, or other suitable sensory output. Non-limiting examples of the output device 1716 include a touchscreen, a monitor, a separate mobile computing device, etc.

Although FIG. 17 depicts the input device 1714 and the output device 1716 as being local to the computing device that executes the image-generating application 110 and/or model-training application 116, other implementations are possible. For instance, in some embodiments, one or more of the input device 1714 and the output device 1716 include a remote client-computing device that communicates with the computing system 1700 via the network interface device 1712 using one or more data networks described herein.

J. General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method of generating simulated images that enhance socio-demographic diversity, the method comprising:
receiving, by an image-generating application, a request to generate a simulated image of a subject, wherein the request includes a set of target socio-demographic attributes that define one or more visual characteristics of the subject;
applying, by the image-generating application, a machine-learning model to the set of target socio-demographic attributes to generate the simulated image, wherein applying the machine-learning model includes:
processing, by a generator component of the machine-learning model, an embedding representing the set of target socio-demographic attributes to generate a candidate simulated image depicting a candidate subject represented by one or more candidate visual characteristics;
determining, by a discriminator component of the machine-learning model, that the one or more candidate visual characteristics of the candidate simulated image depict one or more anatomical features;
generating, by the discriminator component, a set of predicted sociodemographic attributes that define the one or more candidate visual characteristics;
determining, by the discriminator component, whether the set of predicted socio-demographic attributes substantially match the set of target socio-demographic attributes; and
in response to determining that the set of predicted socio-demographic attributes substantially match the set of target socio-demographic attributes, classifying, by the discriminator component, the candidate simulated image as the simulated image; and
outputting, by the image-generating application, the simulated image.

2. The method of claim 1, wherein applying the machine-learning model to the set of target socio-demographic attributes includes:
generating, by the image-generating application, a feature vector that represents the set of target socio-demographic attributes;
accessing, by the image-generating application, a latent code;
applying, by the image-generating application, one or more neural networks to the feature vector and the latent code to generate the embedding, wherein the machine-learning model is applied to the embedding to generate the simulated image.

3. The method of claim 1, wherein determining whether the set of predicted socio-demographic attributes substantially match the set of target socio-demographic attributes includes:
determining a loss between the set of predicted socio-demographic attributes and the set of target socio-demographic attributes; and
modifying one or more parameters of the discriminator component based on the determined loss.

4. The method of claim 3, wherein determining the loss includes using a modified loss function of the discriminator component, wherein the modified loss function is configured to increase a probability of the candidate simulated image to depict the candidate subject having the one or more visual characteristics.

5. The method of claim 1, wherein the machine-learning model was trained using a training dataset comprising a plurality of training images, wherein the plurality of training images include one or more duplicate copies of a training image being associated with the set of target socio-demographic attributes.

6. The method of claim 1, wherein the machine-learning model was trained using a training dataset comprising a plurality of training images, wherein the plurality of training images include one or more augmented copies of a training image being associated with the set of target socio-demographic attributes.

7. The method of claim 6, wherein an augmented copy of the one or more augmented copies is generated by modifying a color of the training image being associated with the set of target socio-demographic attributes.

8. The method of claim 6, wherein an augmented copy of the one or more augmented copies is generated by modifying an orientation of the training image being associated with the set of target socio-demographic attributes.

9. The method of claim 1, wherein the machine-learning model is a generative adversarial network.

10. The method of claim 1, wherein the set of target socio-demographic attributes include age, gender, race, and/or an occupation of the subject.

11. A system comprising:
a data-sampling engine configured to:
receive a plurality of images, wherein each image of the plurality of images depict a respective subject; and
generate a set of training images from the plurality of images, wherein the set of training images include one or more duplicate copies of a training image being associated with a set of target socio-demographic attributes;
a data-augmentation engine configured to:
receive the set of training images from the data-sampling engine; and
generate, based on the set of training images, a set of augmented training images, wherein the set of augmented training images include one or more augmented copies of each training image of the set of training images; and
a training engine configured to:
receive the set of augmented training images from the data-augmentation engine;
process each augmented training image of the set of augmented training images to train a machine-learning model to generate a simulated image, wherein the simulated image depicts a subject that has one or more visual characteristics defined by the set of target socio-demographic attributes, wherein training the machine-learning model comprises:
generating an embedding of each augmented training image; and
using the embedding to train a generator component of the machine-learning model to generate a candidate simulated image depicting a candidate subject represented by one or more candidate visual characteristics; and
output the trained machine-learning model.

12. The system of claim 11, wherein the training engine is further configured to train the machine-learning model by:
training a discriminator component of the machine-learning model to:
receive, from the generator component, the candidate simulated image;
determine that the one or more candidate visual characteristics depict one or more anatomical features;
generate a set of predicted socio-demographic attributes that define the one or more candidate visual characteristics;
determine whether the set of predicted socio-demographic attributes substantially match the set of target socio-demographic attributes; and
in response to determining that the set of predicted socio-demographic attributes substantially match the set of target socio-demographic attributes, classify the candidate simulated image as the simulated image.

13. The system of claim 11, wherein the embedding is generated by:
generating a feature vector that represents the augmented training image;
accessing a latent code; and
applying one or more neural networks to the feature vector and the latent code to generate the embedding.

14. The system of claim 11, wherein the machine-learning model includes a modified loss function configured to increase a probability of the simulated image depicting the subject having the one or more visual characteristics defined by the set of target sociodemographic attributes.

15. The system of claim 11, wherein the machine-learning model is a generative adversarial network.

16. The system of claim 11, wherein an augmented training image of the set of augmented training images is generated by modifying a color of a corresponding training image of the set of training images.

17. The system of claim 11, wherein an augmented training image of the set of augmented training images is generated by modifying an orientation of a corresponding training image of the set of training images.

18. A computer program product tangibly embodied in a non-transitory machine-readable storage medium including instructions configured to cause one or more data processors to perform actions including:
receiving a request to generate a simulated image of a subject, wherein the request includes a set of target socio-demographic attributes that define one or more visual characteristics of the subject;
a step for generating the simulated image of the subject, wherein the simulated image is generated by: (i) applying a generator component of a machine-learning model to the set of target socio-demographic attributes to process an embedding representing the set of target socio-demographic attributes to generate a candidate simulated image depicting a candidate subject represented by one or more candidate visual characteristics; and (ii) applying a discriminator component of the machine-learning model to the candidate simulated image to generate a set of predicted socio-demographic attributes of the candidate simulated image, determine that the set of predicted socio-demographic attributes substantially match the set of target socio-demographic attributes, and classify the candidate simulated image as the simulated image; and
outputting the simulated image.

19. The computer program product of claim 18, wherein the set of target socio-demographic attributes include age, gender, race, and/or an occupation of the subject.

* * * * *